US012767848B2

(12) United States Patent
Guo et al.

(10) Patent No.: US 12,767,848 B2
(45) Date of Patent: Oct. 20, 2026

(54) MULTI-FLUID KIT FOR TEXTILE PRINTING

(71) Applicant: Hewlett-Packard Development Company, L.P., Spring, TX (US)

(72) Inventors: Dennis Z. Guo, San Diego, CA (US); Jie Zheng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 448 days.

(21) Appl. No.: 18/578,555

(22) PCT Filed: Jul. 19, 2021

(86) PCT No.: PCT/US2021/042182
§ 371 (c)(1),
(2) Date: Jan. 11, 2024

(87) PCT Pub. No.: WO2023/003531
PCT Pub. Date: Jan. 26, 2023

(65) Prior Publication Data

US 2024/0301228 A1 Sep. 12, 2024

(51) Int. Cl.

| | |
|---|---|
| ***C09D 11/54*** | (2014.01) |
| ***C09D 11/033*** | (2014.01) |
| ***C09D 11/102*** | (2014.01) |
| ***C09D 11/322*** | (2014.01) |
| ***D06P 1/52*** | (2006.01) |

(Continued)

(52) U.S. Cl.
CPC ............ *C09D 11/54* (2013.01); *C09D 11/033* (2013.01); *C09D 11/102* (2013.01); *C09D 11/322* (2013.01); *D06P 1/5278* (2013.01); *D06P 1/5292* (2013.01); *D06P 5/002* (2013.01); *D06P 5/2077* (2013.01); *D06P 5/30* (2013.01); *D06P 3/64* (2013.01); *D06P 3/704* (2013.01)

(58) Field of Classification Search
None
See application file for complete search history.

(56) References Cited

U.S. PATENT DOCUMENTS 8,703,894 B2 4/2014 Duschek et al.
2008/0282480 A1* 11/2008 Hu ........................ D06M 15/61 8/115.65

(Continued)

FOREIGN PATENT DOCUMENTS

CN 105839430 A 8/2016
CN 110747566 A 2/2020

(Continued)

OTHER PUBLICATIONS

Soleimani-Gorgani et al., "Modification of cotton fabric with a dendrimer to improve ink-jet printing process", Carbohydrate Polymers, Jun. 2015, vol. 131, pp. 168-176.

*Primary Examiner* — Stefanie J Cohen
(74) *Attorney, Agent, or Firm* — Dierker & Kavanaugh, P.C.

(57) ABSTRACT

An example of a multi-fluid kit for textile printing includes a pretreatment fluid and a fixer fluid. The pretreatment fluid includes a linear siloxane comb polymer and a hydrophobic dendrimer. In some examples, the multi-fluid kit also includes a white inkjet ink. In some examples, the multi-fluid kit is part of a kit for textile printing which also includes a textile fabric.

15 Claims, 6 Drawing Sheets

(51) Int. Cl.

| | |
|---|---|
| ***D06P 5/00*** | (2006.01) |
| ***D06P 5/20*** | (2006.01) |
| ***D06P 5/30*** | (2006.01) |
| *D06P 3/64* | (2006.01) |
| *D06P 3/70* | (2006.01) |

(56) References Cited

U.S. PATENT DOCUMENTS

| | | | | |
|---|---|---|---|---|
| 2015/0299400 | A1* | 10/2015 | Wagner | A61K 8/898<br>524/588 |
| 2016/0108577 | A1* | 4/2016 | Gulati | D06M 15/568<br>8/116.1 |
| 2017/0008276 | A1* | 1/2017 | Humet | B41J 11/0015 |
| 2021/0309878 | A1* | 10/2021 | Guo | C09D 11/322 |

FOREIGN PATENT DOCUMENTS

| | | | |
|---|---|---|---|
| WO | 2016/061099 | A1 | 4/2016 |
| WO | 2020/131142 | A1 | 6/2020 |
| WO | 2020/131865 | A1 | 6/2020 |
| WO | 2021/071522 | A1 | 4/2021 |

* cited by examiner

MULTI-FLUID KIT FOR TEXTILE PRINTING

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers are gaining acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
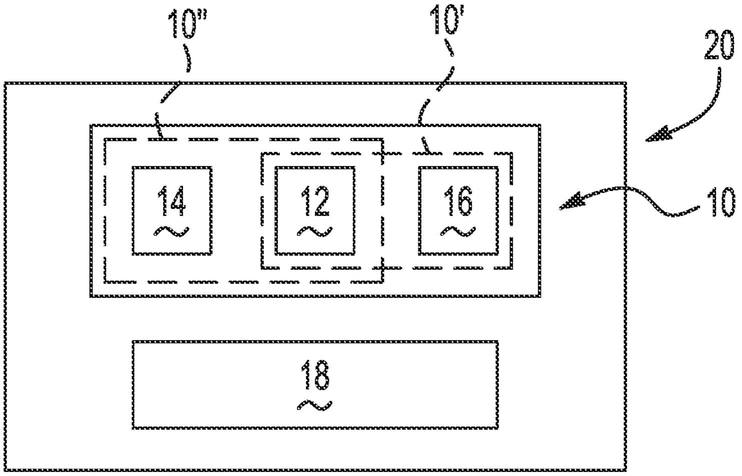
FIG. 1 is a schematic illustration of example multi-fluid kits and example textile printing kits, each of which includes an example of a pretreatment fluid disclosed herein.

The textile is a major industry, and printing on textiles, such as cotton, polyester, etc., has been evolving to include digital printing methods. Some digital printing methods enable direct to garment (or other textile) printing. White ink is one of the most heavily used inks in direct to garment printing. More than two-thirds of the direct to garment printing that is performed utilizes a white ink on a colored textile. Obtaining white images with desirable opacity has proven to be challenging, in part because different textile fabrics introduce different obstacles that can affect the white print. As an example, cotton fabrics are more likely than polyester fabrics to have fibrillation (e.g., hair-like fibers sticking out of the fabric surface). As another example, polyester fabrics are more likely than cotton fabrics to have dye migration (e.g., dye from the underlying textile migrates out of the fabric surface when exposed to heat). Dye migration can color the white print. Systems that are designed for printing on polyester fabrics and reducing dye migration are limiting because they are not suitable for other textiles and they are cost prohibitive for the average consumer.

Disclosed herein is a multi-fluid kit that is particularly suitable for obtaining white images, which may have desirable opacity, durability (i.e., washfastness), and quality. Examples of the multi-fluid kit include at least a pretreatment fluid. Some examples of the multi-fluid kit also include a fixer fluid. Some examples of the multi-fluid kit also include a white inkjet ink. In addition to an aqueous pretreatment vehicle, the pretreatment fluid includes a linear siloxane comb polymer and a hydrophobic dendrimer, which have been found to improve opacity and image quality on both cotton and polyester textile fabrics. The applied and cured pretreatment fluid forms a film on the surface of the textile fabric. Within the film, the comb polymer affixes to a fiber surface of the textile fabric, while the water-repellant hydrophobic dendrimer self-assembles on top of the comb polymer. As such, the pretreatment film allows the pigment of the white inkjet ink to be fixed at or near the surface of the textile fabric, which improves the opacity of the white image that is formed. Moreover, the pretreatment film may be able to hold the hair-like fibers of the textile fabric, which reduces fibrillation and improves image quality. Still further, the fluids in the multi-fluid set may be efficiently cured at relatively low temperatures in an oven, which can reduce migration of the dye from the polyester textile fabric to the surface of the textile fabric, which, in turn, reduces coloration of the white print.

The opacity may be measured in terms of L*, i.e., lightness, of a white print generated on a colored textile fabric. A greater L* value indicates a greater opacity of the white ink on the colored textile fabric. L* is measured in the CIELAB color space, and may be measured using any suitable color measurement instrument (such as those available from HunterLab or X-Rite). The white inkjet ink, when printed on the colored textile fabric pretreated with the pretreatment fluid and the fixer fluid disclosed herein, may generate prints that have a desirable L* value.

The durability of a print on a textile fabric may be assessed by its ability to retain color after being exposed to washing. This is also known as washfastness. Washfastness can be measured in terms of a change in L* before and after washing or in terms of $\Delta E_{76}$. $\Delta E_{76}$ may be calculated using the CIEDE1976 color-difference formula, which is based on the CIELAB color space. Given a pair of color values in CIELAB space $L^*_1$, $a^*_1$, $b^*_1$ and $L^*_2$, $a^*_2$, $b^*_2$, the CIEDE1976 color difference between them is as follows:

$$\Delta E_{76} = \sqrt{\left[(L_2^* - L_1^*)^2 + (a_2^* - a_1^*)^2 + (b_2^* - b_1^*)^2\right]}$$

The fluid(s) and/or white inkjet ink disclosed herein may include different components with different acid numbers. As used herein, the term "acid number" refers to the mass of potassium hydroxide (KOH) in milligrams that is used to neutralize one (1) gram of a particular substance. The test for determining the acid number of a particular substance may vary, depending on the substance. For example, to determine the acid number of a polyurethane-based binder, a known amount of a sample of the binder may be dispersed in water and the aqueous dispersion may be titrated with a polyelectrolyte titrant of a known concentration. In this example, a current detector for colloidal charge measurement may be used. An example of a current detector is the MOtek PCD-05 Smart Particle Charge Detector (available from BTG). The current detector measures colloidal substances in an aqueous sample by detecting the streaming potential as the sample is titrated with the polyelectrolyte titrant to the point of zero charge. An example of a suitable polyelectrolyte titrant is poly(diallyldimethylammonium chloride) (i.e., PolyDADMAC). It is to be understood that any suitable test for a particular component may be used.

Throughout this disclosure, a weight percentage that is referred to as "wt % active" refers to the loading of an active component of a dispersion, or other formulation that is present in the pretreatment fluid, the fixer fluid, or the white inkjet ink. For example, the white pigment may be present in a water-based formulation (e.g., a stock solution or dispersion) before being incorporated into the white inkjet ink. In this example, the wt % actives of the white pigment accounts for the loading (as a weight percent) of the white pigment that is present in the white inkjet ink, and does not account for the weight of the other components (e.g., water, etc.) that are present in the formulation with the white pigment.

The term "molecular weight" as used herein refers to weight average molecular weight (Mw), the units of which are g/mol or Daltons.

The viscosity measurements set forth herein represent those measured by a viscometer at a particular temperature and at a particular shear rate ($s^{-1}$) or at a particular speed. The temperature and shear rate or temperature and speed are identified with individual values. Viscosity may be measured, for example, by a Brookfield viscometer or another suitable instrument.

Sets and Kits

Examples of the multi-fluid kit disclosed herein are shown schematically in FIG. 1. As depicted, each example of the multi-fluid kit 10, 10', 10" comprises a pretreatment fluid 12 including a linear siloxane comb polymer, a hydrophobic dendrimer, and an aqueous pretreatment vehicle. One example of the multi-fluid kit 10' comprises the pretreatment fluid 12 including the linear siloxane comb polymer, the hydrophobic dendrimer, and the aqueous pretreatment vehicle; and a fixer fluid 16 including a cationic polymer and an aqueous fixer vehicle. Another example of the multi-fluid kit 10" comprises the pretreatment fluid 12 including the linear siloxane comb polymer, the hydrophobic dendrimer, and the aqueous pretreatment vehicle; and a white inkjet ink 14. Still another example of the multi-fluid kit 10 comprises the pretreatment fluid 12 including the linear siloxane comb polymer, the hydrophobic dendrimer, and the aqueous pretreatment vehicle; the fixer fluid 16 including the cationic polymer and the aqueous fixer vehicle; and the white inkjet ink 14.

It is to be understood that any example of the pretreatment fluid 12, the fixer fluid 16 (when included), and the white inkjet ink 14 (when included) disclosed herein may be used in the examples of the multi-fluid kits 10, 10', 10".

In the examples disclosed herein, the multi-fluid kits 10, 10', 10" includes the pretreatment fluid 12 that is formulated for analog application (e.g., by a squeegee, a roller, a sprayer, a screen, etc.). Some examples also include the fixer fluid 16 that is formulated for thermal or piezoelectric inkjet printing. Some examples also include the white inkjet ink 14 that is formulated for thermal or piezoelectric inkjet printing.

In any example of the fluid kit 10, 10', 10", the pretreatment fluid 12, the white inkjet ink 14 (when included), and the fixer fluid 16 (when included) may be maintained in separate containers (e.g., respective reservoirs/fluid supplies of respective inkjet cartridges) or separate compartments (e.g., respective reservoirs/fluid supplies) in a single container (e.g., inkjet cartridge).

Examples of the fluid kit 10, 10', 10" may also be part of a kit 20 for textile printing, which is also shown schematically in FIG. 1. In an example, the kit 20 for textile printing comprises a textile fabric 18 selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof; the pretreatment fluid 12 including the linear siloxane comb polymer, the hydrophobic dendrimer, and the aqueous pretreatment vehicle; the fixer fluid 16 including a cationic polymer and an aqueous fixer vehicle; and the white inkjet ink 14. Other examples of the kit 20 include the multi-fluid kit 10' or 10" with the textile fabric 18.

It is to be understood that any example of the pretreatment fluid 12, the fixer fluid 16, and the white inkjet ink 14 (when included) disclosed herein may be used in the examples of the textile printing kit 20.

Pretreatment Fluid

The pretreatment fluid 12 includes the linear siloxane comb polymer, the hydrophobic dendrimer, and the aqueous vehicle. This aqueous vehicle may be referred to herein as the "first aqueous vehicle" or as the "pretreatment aqueous vehicle."

Figure 4:
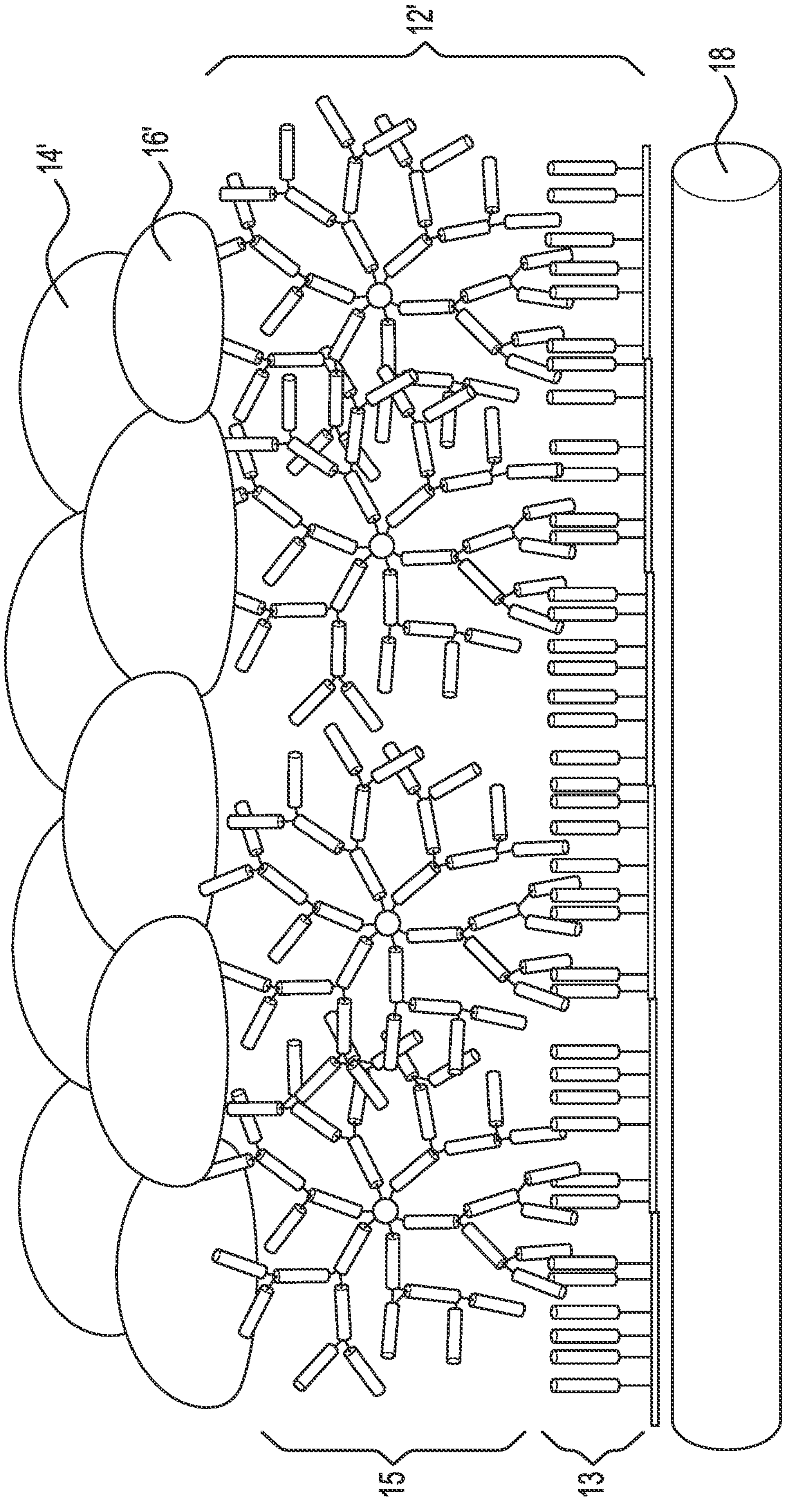
FIG. 4 is a schematic illustration of a textile fabric having a pretreatment film formed thereon and a fixer fluid and an inkjet ink applied thereto, where the pretreatment film includes a linear siloxane comb polymer and a hydrophobic dendrimer.

The linear siloxane comb polymer and the hydrophobic dendrimer are shown, respectively, at reference numerals 13 and 15 in FIG. 4.

In an example, the hydrophobic dendrimer 15 comprises a first generation dendrimer having a structure:

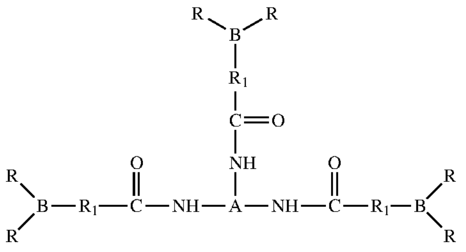

wherein:

A is a molecule with three electron-donating isocyanate groups;

B is CH or N;

R is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—$(CH_2)_z$—H; and NH—C(O)—NH—$(CH_2)_z$—H, where y is an integer from 0 to 2 and z is an integer from 11 to 21; and $R_1$ is selected from the group consisting of $(CH_2)_x$, $O(CH_2)_x$, and NH—$CH(CH_3)$, where x is an integer from 0 to 2. During synthesis of the hydrophobic dendrimer, the first generation structure may be formed alone or in combination with higher generation dendrimers. As such, in some examples, the pretreatment fluid 12 includes the first generation hydrophobic dendrimer, and in other examples, the pretreatment fluid 12 includes the first generation hydrophobic dendrimer and a second hydrophobic dendrimer that is a higher generation dendrimer than the first generation dendrimer. The higher generation dendrimer may be a second generation dendrimer, third generation dendrimer, etc. or may be an imperfect generation whose structure is between the structures of the first and second generations, between the structures of the second and third generations, etc. Dendrimers are classified by generation, where the generation refers to the number of repeated branching cycles that are performed during synthesis of the dendrimer. For example, if a dendrimer is made by convergent synthesis and the branching reactions are performed onto the core molecule three times, the resulting dendrimer is considered a third generation dendrimer. During synthesis, the branching reactions may not be completed at each end group (e.g., the R group in the structure above). In these instances, the imperfect generation is formed where one or more of the end groups undergoes the branching reaction and one or more other end groups does not undergo the branching reaction.

One example of a higher than first generation dendrimer has a structure:

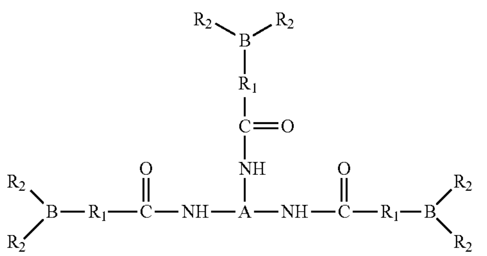

wherein:

A is a molecule with three electron-donating isocyanate groups;

B is CH or N;

$R_1$ is selected from the group consisting of $(CH_2)_x$, $O(CH_2)_x$, and NH—$CH(CH_3)$, where x is an integer from 0 to 2;

at least one of $R_2$ is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—$(CH_2)_z$—H; and NH—C(O)—NH—$(CH_2)_z$—H, where y is an integer from 0 to 2 and z is an integer from 11 to 21;

at least one other of $R_2$ is:

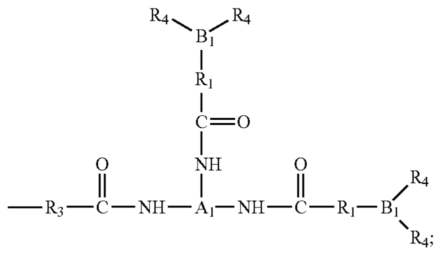

$A_1$ is the same as A;

$B_1$ is the same as B;

$R_3$ is $(CH_2)_p$—O or $CH(CH_3)$—NH, where p is an integer from 0 to 2; and $R_4$ is the same as the at least one $R_2$ that is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—$(CH_2)_z$—H; and NH—C(O)—NH—$(CH_2)_z$—H, where y is an integer from 0 to 2 and z is an integer from 11 to 21. Because all of the $R_2$ groups are not the branched structure shown above, this example is not a complete second generation dendrimer, and thus is an imperfect generation (e.g., 1.X) dendrimer that is higher than the first generation dendrimer and not yet the second generation dendrimer. For the second generation dendrimer, all of the $R_2$ groups would be converted to the branched structure shown immediately above.

The hydrophobic dendrimer 15 may be synthesized by reacting a molecule having three hydroxyl or amine groups with a fatty acid having both a $C_{11}$ to $C_{21}$ alkyl chain and a carboxylic group (—COOH) or an isocyanate group (—N═C═O) to generate a reactive intermediate, and then reacting the intermediate with a molecule having three isocyanate groups.

Some examples of the molecule having three hydroxyl groups include glycerol and triethanolamine. One example of the molecule having three amine groups includes bis(aminoethyl)amine. While some examples have been provided, it is to be understood that other molecules having three hydroxyl or amine groups may be used.

Some examples of the fatty acid having both the $C_{11}$ to $C_{21}$ alkyl chain and the carboxylic group include stearic acid, behenic acid, palmitic acid, and lauric acid. One example of the fatty acid having both the $C_{11}$ to $C_{21}$ alkyl chain and the isocyanate group (—N═C═O) is stearyl isocyanate. While some examples have been provided, it is to be understood that other fatty acids as defined herein may be used.

The molecule having three isocyanate groups are known as triisocyanates, which are multi-functional molecules that include three N═C═O groups for reaction with the reactive intermediate. Example triisocyanates include the diisocyanate trimer of hexamethylene diisocyanate, the isocyanurate trimer of toluene diisocyanate, the isocyanurate trimer of 3-isocyanatomethyl-3,4,4-trimethylcyclohexyl isocyanate, or methane-tris-(phenylisocyanate). Two specific examples of the triisocyanates include:

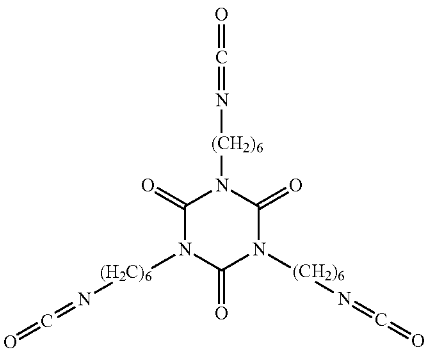

and

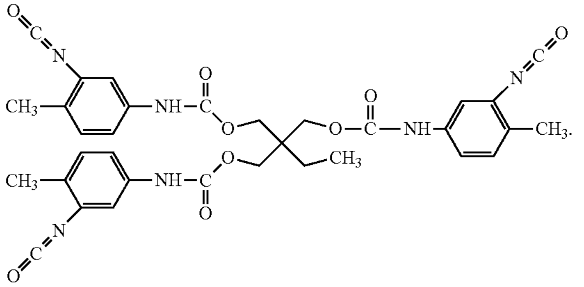

In one specific example, the hydrophobic dendrimer 15 is synthesized by reacting the molecule selected from the group consisting of glycerol, triethanolamine, and bis(aminoethyl)amine with the fatty acid selected from the group consisting of stearic acid, behenic acid, stearyl isocyanate, palmitic acid, and lauric acid in a 1:2 ratio to obtain the reactive intermediate. The reactive intermediate is then reacted in a 3:1 ratio with a triisocyanate selected from the group consisting of a 1,6-hexamethylene diisocyanate trimer, and 2,4-tolylyene diisocyanate. The resulting hydrophobic dendrimer 15 may be a first generation dendrimer or may include a mixture of the first generation dendrimer and a higher than first generation dendrimer.

In an example, the linear siloxane comb polymer has a structure:

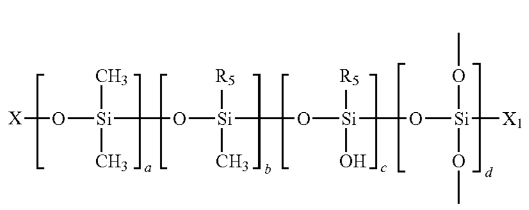

wherein:

X and $X_1$ are independently selected from the group consisting of $R_5$,

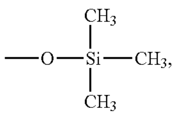, 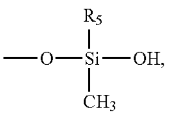, and 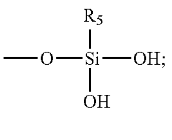;

$R_5$ is selected from the group consisting of a $C_8$ to $C_{28}$ alkyl group,

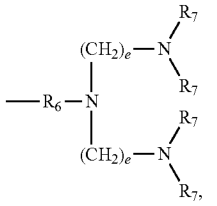, 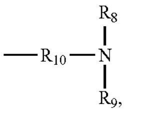, 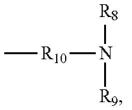, $—(CH_2)_f—NH—(CH_2)_g—NH_2$, $—(CH_2)_g—NH_2$, and 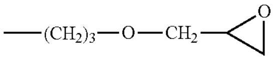, where $R_6$ is selected from the group consisting of

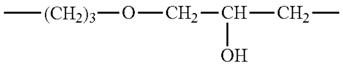

and

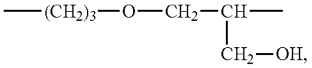, $R_7$ is a $C_1$ to $C_4$ alkyl group, $R_8$ is a $C_8$ to $C_{18}$ alkyl group, $R_9$ is a $C_8$ to $C_{18}$ alkyl group, $R_{10}$ is selected from the group consisting of $—(CH_2)_3—$ and

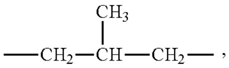, e is 2 or 3, f is 2 or 3, and g is 2 or 3;

a is an integer from 0 to 350;

b is an integer from 0 to 450;

c is an integer from 0 to 100; and d is an integer from 0 to 50.

When the pretreatment fluid 12 is applied and cured, the linear siloxane comb polymer 13 (see FIG. 4) affixes to the surface of textile fiber 18 and the hydrophobic dendrimer 15 (see FIG. 4) self-assembles at the top of the comb polymer 13. The hydrophobic dendrimer's hyperbranched structure contributes to the water repellency of fabrics treated with the pretreatment fluid 12.

In an example, each of the linear siloxane comb polymer 13 and the hydrophobic dendrimer 15 may be present in the pretreatment fluid 12 in an amount ranging from about 0.2 wt % active to about 15 wt % active based on a total weight of the pretreatment fluid 12. As other examples, each of the linear siloxane comb polymer 13 and the hydrophobic dendrimer 15 may be present in the pretreatment fluid 12 in an amount ranging from about 1 wt % active to about 9 wt % active, from about 2 wt % active to about 6 wt % active, etc. In a specific example, the pretreatment fluid 12 includes from about 0.2 wt % active to about 5 wt % active of the linear siloxane comb polymer 13 based on a total weight of the pretreatment fluid; and from about 1 wt % active to about 15 wt % active of the hydrophobic dendrimer 15 based on the total weight of the pretreatment fluid 12.

The linear siloxane comb polymer 13 and the hydrophobic dendrimer 15 may be present in a water based dispersion. The water based dispersion of the linear siloxane comb polymer 13 and the hydrophobic dendrimer 15 may include water or water and a co-solvent, and a dispersant. Any of the co-solvents set forth herein for the pretreatment fluid 12 may be present in the water based dispersion of the linear siloxane comb polymer 13 and the hydrophobic dendrimer 15 in an amount ranging from about 1 wt % active to about 5 wt % active. In one example, the water based dispersion of the linear siloxane comb polymer 13 and the hydrophobic dendrimer 15 includes from about 1 wt % active to about 5 wt % active propylene glycol. In some examples, the water based dispersion of the linear siloxane comb polymer 13 and the hydrophobic dendrimer 15 may include commercially available dispersants, such as ETHOQUAD® HT 25 (polyoxymethylene(15)hydrogenated tallowmethylammonium chloride, available from Nouryon), DISPONIL® A 1080 (a fatty alcohol ($C_{12}$ or $C_{14}$) ethoxylate, available from BASF Corp.), and ARQUAD® 2C-75 (Dicocoalkyldimethyl ammonium chloride, available from Nouryon).

Examples of commercially available water based dispersions that include both the linear siloxane comb polymer 13 and the hydrophobic dendrimer 15 include RUCO-DRY ECO® and RUCO-DRY ECO PLUS®, both of which are available from Rudolf GmbH and are about 20% active dispersions.

The pretreatment fluid 12 may be prepared by adding the desired amount of the linear siloxane comb polymer 13 and the hydrophobic dendrimer 15 to the aqueous pretreatment vehicle. When the linear siloxane comb polymer 13 and the hydrophobic dendrimer 15 are present in a water based dispersion, the dispersion may then be incorporated into the aqueous pretreatment vehicle so that the linear siloxane comb polymer 13 and the hydrophobic dendrimer 15 are present in active amounts that are desirable.

In some examples, the aqueous pretreatment vehicle consists of water; and the pretreatment fluid 12 consists of the linear siloxane comb polymer 13, the hydrophobic dendrimer 15, and the first aqueous vehicle (the aqueous pretreatment vehicle). In these examples, the pretreatment fluid 12 consists of the linear siloxane comb polymer 13, the hydrophobic dendrimer 15, and the water. In this example, the pretreatment fluid 12 includes no other components.

In other examples, the pretreatment fluid 12 may include other additives. As such, the aqueous pretreatment vehicle consists of one of water; or water and an additive selected from the group consisting of a co-solvent, a non-ionic surfactant, an antimicrobial agent, a pH adjuster, and combinations thereof. In some examples, the pretreatment fluid 12 consists of the water, the linear siloxane comb polymer 13, the hydrophobic dendrimer 15, and the pH adjuster. In other examples, the pretreatment fluid 12 consists of the water, the linear siloxane comb polymer 13, the hydrophobic dendrimer 15, and any one or more of the listed additives.

The pretreatment fluid 12 has a pH ranging from about 3 to about 7. Suitable pH ranges for examples of the pretreatment fluid 12 may include from about 3 to about 5, or from about 4 to about 6. In one example, the pH of the pretreatment fluid 12 is about 4.5. In some instances, a pH adjuster may be added to the pretreatment fluid 12 to obtain the desired pH. Examples of suitable pH adjusters for the pretreatment fluid 12 include bases, such as potassium hydroxide (KOH), sodium hydroxide (NaOH), triethylamine, or triethanolamine, etc. Other examples of suitable pH adjusters for the pretreatment fluid 12 include acids, such as nitric acid, methanesulfonic acid, acetic acid, formic acid, or glycolic acid, etc. In an example, the base or the acid may be added to the pretreatment fluid 12 in an aqueous solution, such as an aqueous solution including 5 wt % of the base (e.g., a 5 wt % active potassium hydroxide aqueous solution) or including 99% acetic acid (e.g., a 99 wt % active acetic acid aqueous solution).

In an example, the total amount of pH adjuster(s) in the pretreatment fluid 12 ranges from greater than 0 wt % to about 0.5 wt % (based on the total weight of the pretreatment fluid 12). In another example, the total amount of pH adjuster(s) in the pretreatment fluid 12 ranges from about 0.01 wt % to about 0.2 wt %. In another example, the total amount of pH adjuster(s) in the pretreatment fluid 12 is about 0.03 wt % (based on the total weight of the pretreatment fluid 12). The amount of pH adjuster added depends on the desired pH, and the pH adjuster may be added until the desired pH of the pretreatment fluid 12 is achieved.

The co-solvent in the pretreatment fluid 12 may be a water soluble or water miscible co-solvent. In some instances, the co-solvent may be added to the vehicle of the pretreatment fluid 12, and in other instances, the co-solvent may be introduced as part of the water based dispersion of the linear siloxane comb polymer 13 and the hydrophobic dendrimer 15. Examples of co-solvents include alcohols, amides, esters, ketones, lactones, and ethers. In additional detail, the co-solvent may include aliphatic alcohols, aromatic alcohols, diols, glycol ethers, polyglycol ethers, lactams, caprolactams, formamides, acetamides, and long chain alcohols. Examples of such compounds include primary aliphatic alcohols, secondary aliphatic alcohols, 1,2-alcohols, 1,3-alcohols, 1,5-alcohols, alkyldiols, ethylene glycol alkyl ethers, propylene glycol alkyl ethers (e.g., DOWANOL™ TPM (from Dow Chemical), higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples include ethanol, isopropyl alcohol, butyl alcohol, benzyl alcohol, 2-ethyl-2-(hydroxymethyl)-1,3-propane diol (EPHD), dimethyl sulfoxide, sulfolane, ethylene glycol, diethylene glycol, propylene glycol, butylene glycol, triethylene glycol, 1,5-pentanediol, 1,2-hexanediol, 1,2,6-hexanetriol, glycerin, trimethylolpropane, xylitol, an ethylene oxide adduct of diglycerin, 2-pyrrolidone, 1-(2-hydroxyethyl)-2-pyrrolidone, N-methyl-2-pyrrolidone, and cyclohexylpyrrolidone.

The co-solvent(s) may be present in the pretreatment fluid 12 in an amount ranging from about 0.5 wt % active to about 30 wt % active (based on the total weight of the pretreatment fluid 12). In an example, the total amount of co-solvent(s) present in the pretreatment fluid 12 is about 2 wt % active (based on the total weight of the pretreatment fluid 12).

The surfactant in the pretreatment fluid 12 may be any non-ionic surfactant. Examples of the non-ionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the non-ionic surfactant may include polyoxyethylenenonyl phenylether, polyoxyethyleneoctyl phenylether, and polyoxyethylenedodecyl. Further examples of the non-ionic surfactant may include silicon surfactants such as a polysiloxane oxyethylene adduct; fluorine surfactants such as perfluoroalkylcarboxylate, perfluoroalkyl sulfonate, and oxyethyleneperfluoro alkylether; and biosurfactants such as spiculisporic acid, rhamnolipid, and lysolecithin.

More specific examples of suitable non-ionic surfactants include a silicone-free alkoxylated alcohol surfactant such as, for example, TEGO® Wet 510 (Evonik Degussa) and/or a self-emulsifiable wetting agent based on acetylenic diol chemistry, such as, for example, SURFYNOL® SE-F (Evonik Degussa). Other suitable commercially available non-ionic surfactants include SURFYNOL® 465 (ethoxylatedacetylenic diol), SURFYNOL® 440 (an ethoxylated low-foam wetting agent) SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Evonik Degussa); ZONYL® FSO (a.k.a. CAPSTONE®, which is a water-soluble, ethoxylated non-ionic fluorosurfactant from DuPont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Company); and BYK® 345, BYK® 346, BYK® 347, BYK® 348, BYK® 349 (each of which is a silicone surfactant) (all of which are available from BYK).

In any of the examples disclosed herein, the surfactant may be present in the pretreatment fluid 12 in an amount ranging from about 0.01 wt % active to about 5 wt % active (based on the total weight of the pretreatment fluid 12). In an example, the surfactant is present in the pretreatment fluid 12 in an amount ranging from about 0.05 wt % active to about 3 wt % active, based on the total weight of the pretreatment fluid 12. In another example, the surfactant is present in the pretreatment fluid 12 in an amount of about 0.3 wt % active, based on the total weight of the pretreatment fluid 12.

The pretreatment fluid 12 may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

In an example, the total amount of antimicrobial agent(s) in the pretreatment fluid 12 ranges from about 0.01 wt % active to about 0.05 wt % active (based on the total weight of the pretreatment fluid 12). In another example, the total amount of antimicrobial agent(s) in the pretreatment fluid 12 is about 0.044 wt % active (based on the total weight of the pretreatment fluid 12).

In an example, the pretreatment fluid 12 has a viscosity ranging from about 1 cP to about 10 cP at about 25° C. and a shear rate of about 3,000 Hz.

Fixer Fluid

The fixer fluid 16 includes a cationic polymer and an aqueous fixer vehicle, which is also referred to herein as a second aqueous vehicle. In some examples, the fixer fluid 16 consists of the cationic polymer and the aqueous fixer vehicle. In other examples, the fixer fluid 16 may include additional components.

The cationic polymer included in the fixer fluid 16 has a weight average molecular weight ranging from about 3,000 to about 3,000,000.

In some examples, the cationic polymer of the fixer fluid 16 is selected from the group consisting of poly(diallyldimethylammonium chloride); poly(methylene-co-guanidine) anion, wherein the anion is selected from the group consisting of hydrochloride, bromide, nitrate, sulfate, and sulfonates; a polyamine; poly(dimethylamine-co-epichlorohydrin); a polyethylenimine; a polyamide epichlorohydrin resin; a polyamine epichlorohydrin resin; and a combination thereof. Some examples of commercially available polyamine epichlorohydrin resins may include CREPETROL™ 73, KYMENE™ 736, KYMENE™ 736NA, POLYCUP™ 7360 and POLYCUP™ 7360A, each of which is available from Solenis LLC.

In an example, the cationic polymer of the fixer fluid 16 is present in an amount ranging from about 1 wt % active to about 15 wt % active based on a total weight of the fixer fluid 16. In further examples, the cationic polymer is present in an amount ranging from about 1 wt % active to about 10 wt % active; or from about 4 wt % active to about 8 wt % active; or from about 2 wt % active to about 7 wt % active; or from about 6 wt % active to about 10 wt % active, based on a total weight of the fixer fluid 16.

In one example of the fixer fluid 16, the cationic polymer is an azetidinium-containing polyamine, and the azetidinium-containing polyamine is present in an amount ranging from about 1 wt % active to about 15 wt % active based on a total weight of the fixer fluid 16.

In addition to the cationic polymer, the fixer fluid 16 also includes the fixer vehicle. As used herein, the terms "aqueous fixer vehicle" and "second aqueous vehicle" may refer to the liquid in which the cationic polymer is mixed to form the fixer fluid 16.

In an example of the fixer fluid 16, the fixer vehicle includes a surfactant, a co-solvent, an anti-kogation agent, and a balance of water. In another example, the fixer fluid 16 further comprises a pH adjuster. As such, some examples of the fixer vehicle (and thus the fixer fluid 16) include a surfactant, a co-solvent, an anti-kogation agent, and/or a pH adjuster.

The surfactant in the fixer fluid 16 may be any of the non-ionic surfactants set forth herein for the pretreatment fluid 12 or a cationic surfactant.

Examples of the cationic surfactant include quaternary ammonium salts, such as benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, alkylbenzyldimethylammonium chlorides, distearyldimethylammonium chloride, diethyl ester dimethyl ammonium chloride, dipalmitoylethyl hydroxyethylmonium methosulfate, and ACCOSOFT® 808 (methyl (1) tallow amidoethyl (2) tallow imidazolinium methyl sulfate available from Stepan Company). Other examples of the cationic surfactant include amine oxides, such as lauryldimethylamine oxide, myristamine oxide, cocamine oxide, stearamine oxide, and cetamine oxide.

In any of the examples disclosed herein, the surfactant may be present in the fixer fluid 16 in an amount ranging from about 0.01 wt % active to about 5 wt % active (based on the total weight of the fixer fluid 16). In an example, the surfactant is present in the fixer fluid 16 in an amount ranging from about 0.05 wt % active to about 3 wt % active, based on the total weight of the fixer fluid 16. In another example, the surfactant is present in fixer fluid 16 in an amount of about 0.3 wt % active, based on the total weight of the fixer fluid 16.

The co-solvent in the fixer fluid 16 may be any examples of the water soluble or water miscible co-solvent set forth herein for the pretreatment fluid 12.

The co-solvent(s) may be present in the fixer fluid 16 an amount ranging from about 4 wt % to about 30 wt % (based on the total weight of the fixer fluid 16). In an example, the total amount of co-solvent(s) present in the fixer fluid 16 is about 10 wt % (based on the total weight of the fixer fluid 16).

An anti-kogation agent may also be included in the fixer fluid 16 when it is to be thermal inkjet printed. Kogation refers to the deposit of dried printing liquid on a heating element of a thermal inkjet printhead. Anti-kogation agent(s) is/are included to assist in preventing the buildup of kogation. In some examples, the anti-kogation agent may improve the jettability of the fixer fluid 16. The anti-kogation agent(s) may be present in the fixer fluid 16 in a total amount ranging from about 0.1 wt % active to about 1.5 wt % active, based on the total weight of the fixer fluid 16. In an example, the anti-kogation agent(s) is/are present in an amount of about 0.5 wt % active, based on the total weight of the fixer fluid 16.

Examples of suitable anti-kogation agents include oleth-3-phosphate (commercially available as CRODAFOS™ O3A or CRODAFOS™ N-3A), oleth-5-phosphate (commercially available as CRODAFOS™ O5A), or dextran 500k. Other suitable examples of the anti-kogation agents include CRODAFOS™ HCE (phosphate-ester from Croda Int.), CRODAFOS™ CES (phosphate-based emulsifying and conditioning wax from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. It is to be understood that any combination of the anti-kogation agents listed may be used.

A pH adjuster may also be included in the fixer fluid 16. A pH adjuster may be included in the fixer fluid 16 to achieve a desired pH (e.g., about 4) and/or to counteract any slight pH increase that may occur over time. An example of a suitable pH adjuster that may be used in the fixer fluid 16 includes acetic acid, formic acid, glycolic acid, citric acid, sulfuric acid, hydrochloric acid, methane sulfonic acid, nitric acid, and phosphoric acid. In an example, the total amount of pH adjuster(s) in the fixer fluid 16 ranges from greater than 0 wt % to about 0.1 wt % (based on the total weight of the fixer fluid 16). In another example, the total amount of pH adjuster(s) in the fixer fluid 16 is about 0.03 wt % (based on the total weight of the fixer fluid 16).

The pH of the fixer fluid 16 may be less than 7. As examples, the pH may range from about 2 to less than 7, from about 5.5 to less than 7, from about 5 to less than 6.6, or from about 5.5 to about 6.6. In one example, the pH of the fixer fluid 16 is about 4.

The balance of the fixer fluid 16 is water. As such, the weight percentage of the water present in the fixer fluid 16 will depend, in part, upon the weight percentages of the other components. The water may be purified water or deionized water.

The viscosity of the fixer fluid 16 may vary depending upon the application method that is to be used to apply the fixer fluid 16. As an example, when the fixer fluid 16 is to be applied with an analog applicator, the viscosity of the fixer fluid 16 may range from about 20 centipoise (cP) to about 300 cP (at 20° C. to 25° C. and a shear rate of about 3,000 Hz). As other examples, when the fixer fluid 16 is to be applied with an thermal inkjet applicator/printhead, the viscosity of the fixer fluid 16 may range from about 1 cP to about 9 cP (at 20° C. to 25° C. and a shear rate of about 3,000 Hz), and when the fixer fluid 16 is to be applied with an piezoelectric inkjet applicator/printhead, the viscosity of the fixer fluid 16 may range from about 1 cP to about 20 cP (at 20° C. to 25° C. and a shear rate of about 3,000 Hz).

White Inkjet Ink

The white inkjet ink 14 includes a white pigment, a polymeric binder, and an ink vehicle (the latter of which may be referred to herein as the third aqueous vehicle). In some examples, the white inkjet ink 14 consists of the white pigment, the polymeric binder, and the ink vehicle. In other examples, the white inkjet ink 14 may include additional components.

The white pigment may be incorporated into the ink vehicle to form the white inkjet ink 14. The white pigment may be incorporated as a white pigment dispersion. The white pigment dispersion may include a white pigment and a separate pigment dispersant.

For the white pigment dispersions disclosed herein, it is to be understood that the white pigment and separate pigment dispersant (prior to being incorporated into the ink vehicle to form the white inkjet ink 14), may be dispersed in water alone or in combination with an additional water soluble or water miscible co-solvent, such as 2-pyrrolidone, 1-(2-hydroxyethyl)-2-pyrrolidone, glycerol, 2-methyl-1,3-propanediol, 2,2-dimethyl-1,3-propanediol, 1,2-butane diol, diethylene glycol, 1,3-propanediol, 1,4-butanediol, 1,5-pentanediol, triethylene glycol, tetraethylene glycol, hexylene glycol, or a combination thereof. It is to be understood however, that the liquid components of the white pigment dispersion become part of the ink vehicle in the white inkjet ink 14.

Examples of suitable white pigments include white metal oxide pigments, such as titanium dioxide ($TiO_2$), zinc oxide ($ZnO$), zirconium dioxide ($ZrO_2$), or the like. In one example, the white pigment is titanium dioxide. In an example, the titanium dioxide is in its rutile form.

In some examples, the white pigment may include white metal oxide pigment particles coated with silicon dioxide ($SiO_2$). In one example, the white metal oxide pigment content to silicon dioxide content can be from 100:3.5 to 5:1 by weight. In other examples, the white pigment may include white metal oxide pigment particles coated with silicon dioxide ($SiO_2$) and aluminum oxide ($Al_2O_3$). In one example, the white metal oxide pigment content to total silicon dioxide and aluminum oxide content can be from 50:3 to 4:1 by weight. One example of the white pigment includes TI-PURE® R960 ($TiO_2$ pigment powder with 5.5 wt % silica and 3.3 wt % alumina (based on pigment content)) available from Chemours. Another example of the white pigment includes TI-PURE® R931 ($TiO_2$ pigment powder with 10.2 wt % silica and 6.4 wt % alumina (based on pigment content)) available from Chemours. Still another example of the white pigment includes TI-PURE® R706 ($TiO_2$ pigment powder with 3.0 wt % silica and 2.5 wt % alumina (based on pigment content)) available from Chemours.

The white pigment may have high light scattering capabilities, and the average particle size of the white pigment may be selected to enhance light scattering and lower transmittance, thus increasing opacity. The average particle size of the white pigment may range anywhere from about 10 nm to about 2000 nm. In some examples, the average particle size ranges from about 120 nm to about 2000 nm, from about 150 nm to about 1000 nm, from about 150 nm to about 750 nm, or from about 200 nm to about 500 nm. Smaller particles may be desirable depending upon the jetting architecture that is used. The term "average particle size", as used herein, may refer to a volume-weighted mean diameter of a particle distribution.

The amount of the white pigment in the dispersion may range from about 20 wt % to about 60 wt %, based on the total weight of the dispersion. The white pigment dispersion may then be incorporated into the ink vehicle so that the white pigment is present in an active amount that is suitable for the inkjet printing architecture that is to be used. In an example, the white pigment dispersion is incorporated into the ink vehicle so that the white pigment is present in an amount ranging from about 3 wt % active to about 20 wt % active, based on a total weight of the white inkjet ink 14. In other examples, the white pigment dispersion is incorporated into the ink vehicle so that the white pigment is present in an amount ranging from about 5 wt % active to about 20 wt % active, or from about 5 wt % active to about 15 wt % active, based on a total weight of the white inkjet ink 14. In still another example, the white pigment dispersion is incorporated into the ink vehicle so that the white pigment is present in an amount of about 1 wt % active or about 9.75 wt % active, based on a total weight of the white inkjet ink 14.

The white pigment may be dispersed with the pigment dispersant. In an example, the pigment dispersant is selected from the group consisting of a water-soluble acrylic acid polymer, a branched co-polymer of a comb-type structure with polyether pendant chains and acidic anchor groups attached to a backbone, and a combination thereof.

Some examples of the water-soluble acrylic acid polymer include CARBOSPERSE® K7028 (polyacrylic acid having a weight average molecular weight (Mw) of about 2,300), CARBOSPERSE® K752 (polyacrylic acid having a weight average molecular weight (Mw) of about 2,000), CARBOSPERSE® K7058 (polyacrylic acid having a weight average molecular weight (Mw) of about 7,300), and CARBOSPERSE® K732 (polyacrylic acid having a weight average molecular weight (Mw) of about 6,000), all available from Lubrizol Corporation.

Some examples of the branched co-polymer of the comb-type structure with polyether pendant chains and acidic anchor groups attached to the backbone include DISPERBYK®-190 (an acid number of about 10 mg KOH/g) and DISPERBYK®-199, both available from BYK Additives and Instruments, as well as DISPERSOGEN® PCE available from Clariant.

The amount of the pigment dispersant in the dispersion may range from about 0.1 wt % to about 2 wt %, based on the total weight of the dispersion. The white pigment dispersion may then be incorporated into the ink vehicle so that the pigment dispersant is present in an amount ranging from about 0.01 wt % active to about 0.5 wt % active, based on a total weight of the white inkjet ink 14. In one of these examples, the dispersant is present in an amount of about 0.04 wt % active, based on a total weight of the white inkjet ink 14.

In some examples, the pigment dispersant includes both the water-soluble acrylic acid polymer and the branched co-polymer of the comb-type structure with polyether pendant chains and acidic anchor groups attached to the backbone. In some of these examples, the pigment dispersant includes CARBOSPERSE® K7028 and DISPERBYK®-190. In some of these examples, the pigment dispersant includes both the water-soluble acrylic acid polymer and the branched co-polymer of the comb-type structure with polyether pendant chains and acidic anchor groups attached to the backbone, where the water-soluble acrylic acid polymer is present in an amount ranging from about 0.02 wt % active to about 0.4 wt % active, and the branched co-polymer of the comb-type structure with polyether pendant chains and acidic anchor groups attached to the backbone is present in an amount ranging from about 0.03 wt % active to about 0.6 wt % active. In one of these examples, the water-soluble acrylic acid polymer is present in an amount of about 0.09 wt % active, and the branched co-polymer of the comb-type structure with polyether pendant chains and acidic anchor groups attached to the backbone is present in an amount of about 0.14 wt % active.

The white inkjet ink 14 also includes a polymeric binder, which is one of: a polyurethane-based binder selected from the group consisting of a polyester-polyurethane binder, a polyether-polyurethane binder, a polycarbonate-polyurethane binder, and combinations thereof; or an acrylic latex binder.

In an example, the polymeric binder in the white inkjet ink 14 is a polyurethane-based binder selected from the group consisting of a polyester-polyurethane binder, a polyether-polyurethane binder, a polycarbonate-polyurethane binder, and combinations thereof.

In an example, the white inkjet ink 14 includes the polyester-polyurethane binder. In an example, the polyester-polyurethane binder is an anionic sulfonated polyester-polyurethane binder. The sulfonated polyester-polyurethane binder can include diaminesulfonate groups. In an example, the polymeric binder is the polyester-polyurethane binder. The polyester-polyurethane binder is a sulfonated polyester-polyurethane binder, and is one of: i) an aliphatic compound including multiple saturated $C_4$ to $C_{10}$ carbon chains and/or an alicyclic carbon moiety, that is devoid of an aromatic moiety, or ii) an aromatic compound including an aromatic moiety and multiple saturated carbon chain portions ranging from $C_4$ to $C_{10}$ in length.

As mentioned, the sulfonated polyester-polyurethane binder can be anionic. In further detail, the sulfonated polyester-polyurethane binder can also be aliphatic, including saturated carbon chains as part of the polymer backbone or as a side-chain thereof, e.g., $C_2$ to $C_{10}$, $C_3$ to $C_9$, or $C_3$ to $C_6$ alkyl. The sulfonated polyester-polyurethane binder can also contain alicyclic carbon moiety. These polyester-polyurethane binders can be described as "aliphatic" because these carbon chains are saturated and because they are devoid of aromatic moieties. An example of a commercially available anionic aliphatic polyester-polyurethane binder that can be used is IMPRANIL® DLN-SD (Mw 133,000; Acid Number 5.2; Tg −47° C.; Melting Point 175-200° C.) from Covestro. Example components used to prepare the IMPRANIL® DLN-SD or other anionic aliphatic polyester-polyurethane binders suitable for the examples disclosed herein can include pentyl glycols (e.g., neopentyl glycol); $C_4$ to $C_{10}$ alkyldiol (e.g., hexane-1,6-diol); $C_4$ to $C_{10}$ alkyl dicarboxylic acids (e.g., adipic acid); $C_4$ to $C_{10}$ alkyldiamine (e.g., (2,4,4)-trimethylhexane-1,6-diamine (TMD), isophorone diamine (IPD)); $C_4$ to $C_{10}$ alkyl diisocyanates (e.g., hexamethylene diisocyanate (HDI), (2,4,4)-trimethylhexane-1,6-diisocyanate (TMDI)); alicyclic diisocyanates (e.g. isophorone diisocyanate (IPDI), 1,3-bis(isocyanatomethyl)cyclohexane (H6XDI)); diamine sulfonic acids (e.g., 2-[(2-aminoethyl)amino]ethanesulfonic acid); etc.

Alternatively, the sulfonated polyester-polyurethane binder can be aromatic (or include an aromatic moiety) and can include aliphatic chains. An example of an anionic aromatic polyester-polyurethane binder that can be used is DISPERCOLL® U42. Example components used to prepare the DISPERCOLL® U42 or other similar aromatic polyester-polyurethane binders can include aromatic dicarboxylic acids, e.g., phthalic acid; $C_4$ to $C_{10}$ alkyl dialcohols (e.g., hexane-1,6-diol); $C_4$ to $C_{10}$ alkyl diisocyanates (e.g., hexamethylene diisocyanate (HDI)); diamine sulfonic acids (e.g., 2-[(2-aminoethyl)amino]ethanesulfonic acid); etc.

Other types of anionic polyester-polyurethanes can also be used, including IMPRANIL® DL 1380, which can be somewhat more difficult to jet from thermal inkjet printheads compared to IMPRANIL® DLN-SD and DISPERCOLL® U42, but still can be acceptably jetted in some examples, and can also provide acceptable washfastness results on a variety of fabric types.

The polyester-polyurethane binders disclosed herein may have a weight average molecular weight ranging from about 20,000 to about 300,000. In some examples of the white inkjet ink 14, the polymeric binder is the polyester-polyurethane binder, and the polyester-polyurethane binder has a weight average molecular weight ranging from about 20,000 to about 300,000. As examples, the weight average molecular weight can range from about 50,000 to about 1,000,000, from about 100,000 to about 400,000, or from about 150,000 to about 300,000.

The polyester-polyurethane binders disclosed herein may have an acid number that ranges from about 1 mg KOH/g to about 50 mg KOH/g. In some examples of the white inkjet ink 14, the polymeric binder is the polyester-polyurethane binder, and the polyester-polyurethane binder has an acid number that ranges from about 1 mg KOH/g to about 50 mg KOH/g. As other examples, the acid number of the polyester-polyurethane binder can range from about 1 mg KOH/g to about 200 mg KOH/g, from about 2 mg KOH/g to about 100 mg KOH/g, or from about 3 mg KOH/g to about 50 mg KOH/g.

The average particle size of the polyester-polyurethane binders disclosed herein may range from about 20 nm to about 500 nm. As examples, the sulfonated polyester-polyurethane binder can have an average particle size ranging from about 20 nm to about 500 nm, from about 50 nm to about 350 nm, or from about 100 nm to about 350 nm. The particle size of any solids herein, including the average particle size of the dispersed polymer binder, can be determined using a NANOTRAC® Wave device, from Microtrac, e.g., NANOTRAC® Wave II or NANOTRAC® 150, etc., which measures particles size using dynamic light scattering. Average particle size can be determined using particle size distribution data generated by the NANOTRAC® Wave device. As mentioned, the term "average particle size" may refer to a volume-weighted mean diameter of a particle distribution.

Other examples of the white inkjet ink 14 include an anionic polyether-polyurethane binder. Examples of anionic polyether-polyurethanes that may be used include IMPRANIL® LP DSB 1069, IMPRANIL® DLE, IMPRANIL® DAH, or IMPRANIL® DL 1116 (Covestro (Germany)); or HYDRAN® WLS-201 or HYDRAN® WLS-201 K (DIC Corp. (Japan)); or TAKELAC® W-6061T or TAKELAC® WS-6021 (Mitsui (Japan)).

Still other examples of the white inkjet ink 14 include an anionic polycarbonate-polyurethane binder. Examples of anionic polycarbonate-polyurethanes that may be used as the polymeric binder include IMPRANIL® DLC-F or IMPRANIL® DL 2077 (Covestro (Germany)); or HYDRAN® WLS-213 (DIC Corp. (Japan)); or TAKELAC® W-6110 (Mitsui (Japan)).

Examples of non-ionic polyurethane binders include RUCO-PUR® SPH (a hydrophilic, non-ionic polyurethane available from Rudolf Group) and RUGO-COAT® EC 4811 (an aqueous polyurethane/polyether dispersion available from Rudolf Group). Another example of a non-ionic polyurethane binder includes IMPRANIL® DLI (polyether-polyurethane available from Covestro).

Additional examples of the white inkjet ink 14 include an acrylic latex binder. The acrylic latex binder includes latex particles. As used herein, the term "latex" refers to a stable dispersion of polymer particles in an aqueous medium. As such, the polymer (latex) particles may be dispersed in water or water and a suitable co-solvent. This aqueous latex dispersion may be incorporated into a suitable ink vehicle to form examples of the white inkjet ink 14.

The acrylic latex binder may be anionic or non-ionic depending upon the monomers used.

In some examples, the acrylic latex particles can include a polymerization product of monomers including: a copolymerizable surfactant; an aromatic monomer selected from styrene, an aromatic (meth)acrylate monomer, and an aromatic (meth)acrylamide monomer; and multiple aliphatic (meth)acrylate monomers or multiple aliphatic (meth)acrylamide monomers. The term "(meth)" indicates that the acrylamide, the acrylate, etc., may or may not include the methyl group. In one example, the latex particles can include a polymerization product of a copolymerizable surfactant such as HITENOL™ BC-10, BC-30, KH-05, or KH-10. In another example, the latex particles can include a polymerization product of styrene, methyl methacrylate, butyl acrylate, and methacrylic acid.

In another particular example, the latex particles can include a first heteropolymer phase and a second heteropolymer phase. The first heteropolymer phase is a polymerization product of multiple aliphatic (meth)acrylate monomers or multiple aliphatic (meth)acrylamide monomers. The second heteropolymer phase can be a polymerization product of an aromatic monomer with a cycloaliphatic monomer, wherein the aromatic monomer is an aromatic (meth)acrylate monomer or an aromatic (meth)acrylamide monomer, and wherein the cycloaliphatic monomer is a cycloaliphatic (meth)acrylate monomer or a cycloaliphatic (meth)acrylamide monomer. The second heteropolymer phase can have a higher glass transition temperature than the first heteropolymer phase. The first heteropolymer composition may be considered a soft polymer composition and the second heteropolymers composition may be considered a hard polymer composition.

The two phases can be physically separated in the latex particles, such as in a core-shell configuration, a two-hemisphere configuration, smaller spheres of one phase distributed in a larger sphere of the other phase, interlocking strands of the two phases, and so on.

The first heteropolymer composition can be present in the latex particles in an amount ranging from about 15 wt % to about 70 wt % of a total weight of the polymer (latex) particle and the second heteropolymer composition can be present in an amount ranging from about 30 wt % to about 85 wt % of the total weight of the polymer particle. In other examples, the first heteropolymer composition can be present in an amount ranging from about 30 wt % to about 40 wt % of a total weight of the polymer particle and the second heteropolymer composition can be present in an amount ranging from about 60 wt % to about 70 wt % of the total weight of the polymer particle. In one specific example, the first heteropolymer composition can be present in an amount of about 35 wt % of a total weight of the polymer particle and the second heteropolymers composition can be present in an amount of about 65 wt % of the total weight of the polymer particle.

As mentioned herein, the first heteropolymer phase can be polymerized from two or more aliphatic (meth)acrylate ester monomers or two or more aliphatic (meth)acrylamide monomers. The aliphatic (meth)acrylate ester monomers may be linear aliphatic (meth)acrylate ester monomers and/or cycloaliphatic (meth)acrylate ester monomers. Examples of the linear aliphatic (meth)acrylate ester monomers can include ethyl acrylate, ethyl methacrylate, benzyl acrylate, benzyl methacrylate, propyl acrylate, propyl methacrylate, isopropyl acrylate, isopropyl methacrylate, butyl acrylate, butyl methacrylate, isobutyl acrylate, isobutyl methacrylate, hexyl acrylate, hexyl methacrylate, isooctyl acrylate, isooctyl methacrylate, octadecyl acrylate, octadecyl methacrylate, lauryl acrylate, lauryl methacrylate, hydroxyethyl acrylate, hydroxyethyl methacrylate, hydroxyhexyl acrylate, hydroxyhexyl methacrylate, hydroxyoctadecyl acrylate, hydroxyoctadecyl methacrylate, hydroxylauryl methacrylate, hydroxylauryl acrylate, 2-ethylhexyl acrylate, 2-ethylhexyl methacrylate, and combinations thereof. Examples of the cycloaliphatic (meth)acrylate ester monomers can include cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, and combinations thereof.

Also as mentioned herein, the second heteropolymer phase can be polymerized from a cycloaliphatic monomer and an aromatic monomer. The cycloaliphatic monomer can be a cycloaliphatic (meth)acrylate monomer or a cycloaliphatic (meth)acrylamide monomer. The aromatic monomer can be an aromatic (meth)acrylate monomer or an aromatic (meth)acrylamide monomer. The cycloaliphatic monomer of the second heteropolymer phase can be cyclohexyl acrylate, cyclohexyl methacrylate, methylcyclohexyl acrylate, methylcyclohexyl methacrylate, trimethylcyclohexyl acrylate, trimethylcyclohexyl methacrylate, tert-butylcyclohexyl acrylate, tert-butylcyclohexyl methacrylate, or a combination thereof. In still further examples, the aromatic monomer of the second heteropolymer phase can be 2-phenoxyethyl methacrylate, 2-phenoxyethyl acrylate, phenyl propyl methacrylate, phenyl propyl acrylate, benzyl methacrylate, benzyl acrylate, phenylethyl methacrylate, phenylethyl acrylate, benzhydryl methacrylate, benzhydryl acrylate, 2 -hydroxy-3-phenoxypropyl acrylate, 2-hydroxy-3-phenoxypropyl methacrylate, N-benzyl methacrylamide, N-benzyl acrylamide, N,N-diphenyl methacrylamide, N,N-diphenyl acrylamide, naphthyl methacrylate, naphthyl acrylate, phenyl methacrylate, phenyl acrylate, or a combination thereof.

The latex particles can have a particle size ranging from 20 nm to 500 nm, from 50 nm to 350 nm, or from 150 nm to 270 nm.

In some examples, the latex particles can be prepared by flowing multiple monomer streams into a reactor. An initiator can also be included in the reactor. The initiator may be selected from a persulfate, such as a metal persulfate or an ammonium persulfate. In some examples, the initiator may be selected from a sodium persulfate, ammonium persulfate or potassium persulfate. The preparation process may be performed in water, resulting in the aqueous latex dispersion.

Examples of anionic acrylic latex binders include JANTEX™ Binder 924 and JANTEX™ Binder 45 NRF (both of which are available from Jantex). Other examples of anionic acrylic latex binders include TEXICRYL™ 13-216, TEXICRYL™13-217, TEXICRYL™13-220, TEXICRYL™13-294, TEXICRYL™13-295, TEXICRYL™13-503, and TEXICRYL™13-813 (each of which is available from Scott Bader). Still other examples of anionic acrylic latex binders include TUBIFAST™ AS 4010 FF, TUBIFAST™ AS 4510 FF, and TUBIFAST™ AS 5087 FF (each of which is available from CHT).

Examples of non-ionic acrylic latex binders include PRINTRITE™ 595, PRINTRITE™ 2015, PRINTRITE™ 2514, PRINTRITE™ 9691, and PRINTRITE™ 96155 (each of which is available from Lubrizol Corporation). Another example of a non-ionic acrylic latex binder includes TEXICRYL™ 13-440 (available from Scott Bader).

In some examples of the white inkjet ink 14, the polymeric binder is present in an amount ranging from about 1 wt % active to about 20 wt % active, based on a total weight of the white inkjet ink 14. In other examples, the polymeric binder can be present, in the white inkjet ink 14, in an amount ranging from about 2 wt % active to about 15 wt % active, or from about from about 3 wt % active to about 11 wt % active, or from about 4 wt % active to about 10 wt % active, or from about 5 wt % active to about 9 wt % active, each of which is based on the total weight of the white inkjet ink 14.

The polymeric binder (prior to being incorporated into the ink vehicle) may be dispersed in water alone or in combination with an additional water soluble or water miscible co-solvent, such as 2-pyrrolidone, 1-(2-hydroxyethyl)-2-pyrrolidone, glycerol, 2-methyl-1,3-propanediol, 1,2-butane diol, diethylene glycol, triethylene glycol, tetraethylene glycol, or a combination thereof. It is to be understood however, that the liquid components of the binder dispersion become part of the vehicle in the white inkjet ink 14.

In addition to the pigment and the polymeric binder, the white inkjet ink 14 includes an ink vehicle.

As used herein, the terms "ink vehicle" and "third aqueous vehicle" may refer to the liquid with which the pigment (dispersion) and polymeric binder (dispersion) are mixed to form a thermal or a piezoelectric inkjet ink(s) composition. A wide variety of vehicles may be used with the ink composition(s) of the present disclosure. The ink vehicle may include water and any of: a co-solvent, a surfactant, an anti-kogation agent, an anti-decel agent, an antimicrobial agent, a rheology modifier, a pH adjuster, or combinations thereof. In an example of the white inkjet ink 14, the vehicle includes water and a co-solvent. In another example, the vehicle consists of water and the co-solvent, the anti-kogation agent, the anti-decel agent, the surfactant, the antimicrobial agent, a rheology modifier, a pH adjuster, or a combination thereof. In still another example, the ink vehicle consists of the anti-kogation agent, the anti-decel agent, the surfactant, the antimicrobial agent, a rheology modifier, a pH adjuster, and water.

The co-solvent in the white inkjet ink 14 may be any example of the co-solvents set forth herein for the pretreatment fluid 12, in any amount set forth herein for the pretreatment fluid 12 (except that the amount(s) are based on the total weight of the white inkjet ink 14 instead of the pretreatment fluid 12). Higher amounts (e.g., 30 wt % or more, such as 40 wt %, 50 wt %, up to 60 wt %) of co-solvent may also be used in the white ink 14.

The surfactant in the white inkjet ink 14 may be any non-ionic surfactant set forth herein for the pretreatment fluid 12 and/or any anionic surfactant.

Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzene-sulfonate, isopropylnaphthalenesulfonate, monobutylphenylphenol monosulfonate, monobutylbiphenyl sulfonate, monobutylbiphenylsulfonate, and dibutylphenylphenol disulfonate.

Furthermore, the anionic and/or non-ionic surfactant may be included in the white inkjet ink 14 in any amount set forth herein for the surfactant in the pretreatment fluid 12 (except that the amount(s) are based on the total weight of the white inkjet ink 14 instead of the pretreatment fluid 12).

An anti-kogation agent may also be included in the vehicle of the white inkjet ink 14, for example, when the white inkjet ink 14 is to be applied via a thermal inkjet printhead. As mentioned herein, anti-kogation agent(s) is/are included to assist in preventing the buildup of kogation. In some examples, the anti-kogation agent may improve the jettability of the white inkjet ink 14. Any of the anti-kogation agents set forth herein for the fixer fluid 16 may be used in the white inkjet ink 14. It is to be understood that any combination of the anti-kogation agents listed may be used. The anti-kogation agent may be present in the white inkjet ink 14 in an amount ranging from about 0.1 wt % active to about 1.5 wt % active, based on the total weight of the white inkjet ink 14. In an example, the anti-kogation agent is present in an amount of about 0.5 wt % active, based on the total weight of the white inkjet ink 14.

The ink vehicle may also include anti-decel agent(s). The anti-decel agent may function as a humectant. Decel refers to a decrease in drop velocity over time with continuous firing. In the examples disclosed herein, the anti-decel agent(s) is/are included to assist in preventing decel. In some examples, the anti-decel agent may improve the jettability of the white inkjet ink 14. An example of a suitable anti-decel agent is ethoxylated glycerin having the following formula:

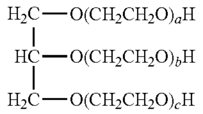

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

The anti-decel agent(s) may be present in an amount ranging from about 0.2 wt % active to about 5 wt % active (based on the total weight of the white inkjet ink 14). In an example, the anti-decel agent is present in the white inkjet ink 14 in an amount of about 1 wt % active, based on the total weight of the white inkjet ink 14.

The vehicle of the white inkjet ink 14 may also include antimicrobial agent(s). Antimicrobial agents are also known as biocides and/or fungicides. Examples of suitable antimicrobial agents include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

In an example, the total amount of antimicrobial agent(s) in the white inkjet ink 14 ranges from about 0.01 wt % active to about 0.05 wt % active (based on the total weight of the white inkjet ink 14). In another example, the total amount of antimicrobial agent(s) in the white inkjet ink 14 is about 0.044 wt % active (based on the total weight of the white inkjet ink 14).

The ink vehicle may also include rheology additive(s). The rheology additive may be added to adjust the viscosity of the white inkjet ink 14 and to aid in redispersibility of the white inkjet ink after it has sat idle. Examples of suitable rheology additives include boehmite, laponite, anionic cellulose (e.g., carboxymethyl cellulose, cellulose sulfate, nitrocellulose, and combinations thereof), and combinations thereof.

In an example, the total amount of rheology additive(s) in the white inkjet ink 14 ranges from about 0.005 wt % active to about 5 wt % active (based on the total weight of the white inkjet ink 14).

The ink vehicle of the white inkjet ink 14 may also include a pH adjuster. A pH adjuster may be included in the white inkjet ink 14 to achieve a desired pH of greater than 7. Suitable pH ranges for examples of the white inkjet ink 14 can be from greater than 7 to about 11, from greater than 7 to about 10, from about 7.2 to about 10, from about 7.5 to about 10, from about 8 to about 10, from about 7 to about 9, from about 7.2 to about 9, from about 7.5 to about 9, from about 8 to about 9, from about 7 to about 8.5, from about 7.2 to about 8.5, from about 7.5 to about 8.5, from about 8 to about 8.5, from about 7 to about 8, from about 7.2 to about 8, or from about 7.5 to about 8.

The type and amount of pH adjuster that is added may depend upon the initial pH of the white inkjet ink 14 and the desired final pH of the white inkjet ink 14. If the initial pH is too high, an acid may be added to lower the pH, and if the initial pH is too low, a base may be added increase the pH. Examples of suitable pH adjusters include metal hydroxide bases, such as potassium hydroxide (KOH), sodium hydroxide (NaOH), etc. In an example, the metal hydroxide base may be added to the while inkjet ink 14 in an aqueous solution. In another example, the metal hydroxide base may be added to the white inkjet ink 14 in an aqueous solution including 5 wt % of the metal hydroxide base (e.g., a 5 wt % potassium hydroxide aqueous solution). Any of the acidic pH adjusters mentioned herein may also be used.

In an example, the total amount of pH adjuster(s) in the white inkjet ink 14 ranges from greater than 0 wt % to about 0.1 wt % (based on the total weight of the white inkjet ink 14). In another example, the total amount of pH adjuster(s) in the white inkjet ink 14 is about 0.03 wt % (based on the total weight of the white inkjet ink 14).

The balance of the white inkjet ink 14 is water. In an example, purified water or deionized water may be used. The water included in the white inkjet ink 14 may be: i) part of the pigment dispersion, and/or binder dispersion, ii) part of the ink vehicle, iii) added to a mixture of the pigment dispersion, and/or binder dispersion and the ink vehicle, or iv) a combination thereof. In examples where the white inkjet ink 14 is a thermal inkjet ink, the ink vehicle includes at least 70% by weight of water. In examples where the white inkjet ink 14 is a piezoelectric inkjet ink, the liquid vehicle is a solvent based vehicle including at least 50% by weight of the co-solvent.

One specific example of the white inkjet ink 14 includes the pigment in an amount ranging from about 1 wt % active to about 10 wt % active based on the total weight of the white inkjet ink 14; the polymeric binder in an amount ranging from about 2 wt % active to about 10 wt % active of the total weight of the white inkjet ink 14; an additive selected from the group consisting of a non-ionic surfactant, an antimicrobial agent, an anti-decel agent, a rheology modifier, and combinations thereof; and the liquid vehicle, which includes water and an organic solvent (e.g., the co-solvent disclosed herein).

Examples of the white inkjet ink 14 disclosed herein may be used in a thermal inkjet printer or in a piezoelectric printer. The viscosity of the white inkjet ink 14 may be adjusted for the type of printhead by adjusting the co-solvent level, adjusting the polymeric binder level, and/or adding a viscosity modifier. When used in a thermal inkjet printer, the viscosity of the white inkjet ink 14 may be modified to range from about 1 cP to about 9 cP (at 20° C. to 25° C. measured at a shear rate of about 3,000 Hz). When used in a piezoelectric printer, the viscosity of the white inkjet ink 14 may be modified to range from about 1 cP to about 20 cP (at 20° C. to 25° C. measured at a shear rate of about 3,000 Hz), depending on the type of the printhead that is being used (e.g., low viscosity printheads, medium viscosity printheads, or high viscosity printheads).

Textile Fabrics

In the examples disclosed herein, the textile fabric 18 may be selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof. In a further example, the textile fabric 18 is selected from the group consisting of cotton fabrics and cotton blend fabrics.

It is to be understood that organic textile fabrics and/or inorganic textile fabrics may be used for the textile fabric 18. Some types of fabrics that can be used include various fabrics of natural and/or synthetic fibers. It is to be understood that the polyester fabrics may be a polyester coated surface. The polyester blend fabrics may be blends of polyester and other materials (e.g., cotton, linen, etc.). In another example, the textile fabric 18 may be selected from nylons (polyamides) or other synthetic fabrics.

Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources (e.g. cornstarch, tapioca products, sugarcanes), etc. Example synthetic fibers used in the textile fabric/substrate 18 can include polymeric fibers such as nylon fibers, polyvinyl chloride (PVC) fibers, PVC-free fibers made of polyester, polyamide, polyimide, polyacrylic, polypropylene, polyethylene, polyurethane, polystyrene, polyaramid (e.g., KEVLAR®) polytetrafluoroethylene (TEFLON®) (both trademarks of E.I. du Pont de Nemours and Company, Delaware), fiberglass, polytrimethylene, polycarbonate, polyethylene terephthalate, polyester terephthalate, polybutylene terephthalate, or a combination thereof. In an example, natural and synthetic fibers may be combined at ratios of 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both the polymeric fiber and a surface of the fabric, a plasma treatment, a solvent treatment, acid etching, or a biological treatment, an enzyme treatment, or antimicrobial treatment to prevent biological degradation.

In addition, the textile fabric 18 can contain additives, such as a colorant (e.g., pigments, dyes, and tints), an antistatic agent, a brightening agent, a nucleating agent, an antioxidant, a UV stabilizer, a filler, and/or a lubricant, for example.

It is to be understood that the terms "textile fabric" or "fabric substrate" do not include materials commonly known as any kind of paper (even though paper can include multiple types of natural and synthetic fibers or mixtures of both types of fibers). Fabric substrates can include textiles in filament form, textiles in the form of fabric material, or textiles in the form of fabric that has been crafted into finished articles (e.g., clothing, blankets, tablecloths, napkins, towels, bedding material, curtains, carpet, handbags, shoes, banners, signs, flags, etc.). In some examples, the fabric substrate can have a woven, knitted, non-woven, or tufted fabric structure. In one example, the fabric substrate can be a woven fabric where warp yarns and weft yarns can be mutually positioned at an angle of about 90°. This woven fabric can include fabric with a plain weave structure, fabric with twill weave structure where the twill weave produces diagonal lines on a face of the fabric, or a satin weave. In another example, the fabric substrate can be a knitted fabric with a loop structure. The loop structure can be a warp-knit fabric, a weft-knit fabric, or a combination thereof. A warp-knit fabric refers to every loop in a fabric structure that can be formed from a separate yarn mainly introduced in a longitudinal fabric direction. A weft-knit fabric refers to loops of one row of fabric that can be formed from the same yarn. In a further example, the fabric substrate can be a non-woven fabric. For example, the non-woven fabric can be a flexible fabric that can include a plurality of fibers or filaments that are one or both bonded together and interlocked together by a chemical treatment process (e.g., a solvent treatment), a mechanical treatment process (e.g., embossing), a thermal treatment process, or a combination of multiple processes.

In one example, the textile fabric 18 can have a basis weight ranging from 10 gsm to 500 gsm. In another example, the textile fabric 18 can have a basis weight ranging from 50 gsm to 400 gsm. In other examples, the textile fabric 18 can have a basis weight ranging from 100 gsm to 300 gsm, from 75 gsm to 250 gsm, from 125 gsm to 300 gsm, or from 150 gsm to 350 gsm.

The textile fabric 18 may be any color, and in an example is a color other than white (e.g., black, grey, red, etc.).

Printing Method and System

Figure 2:
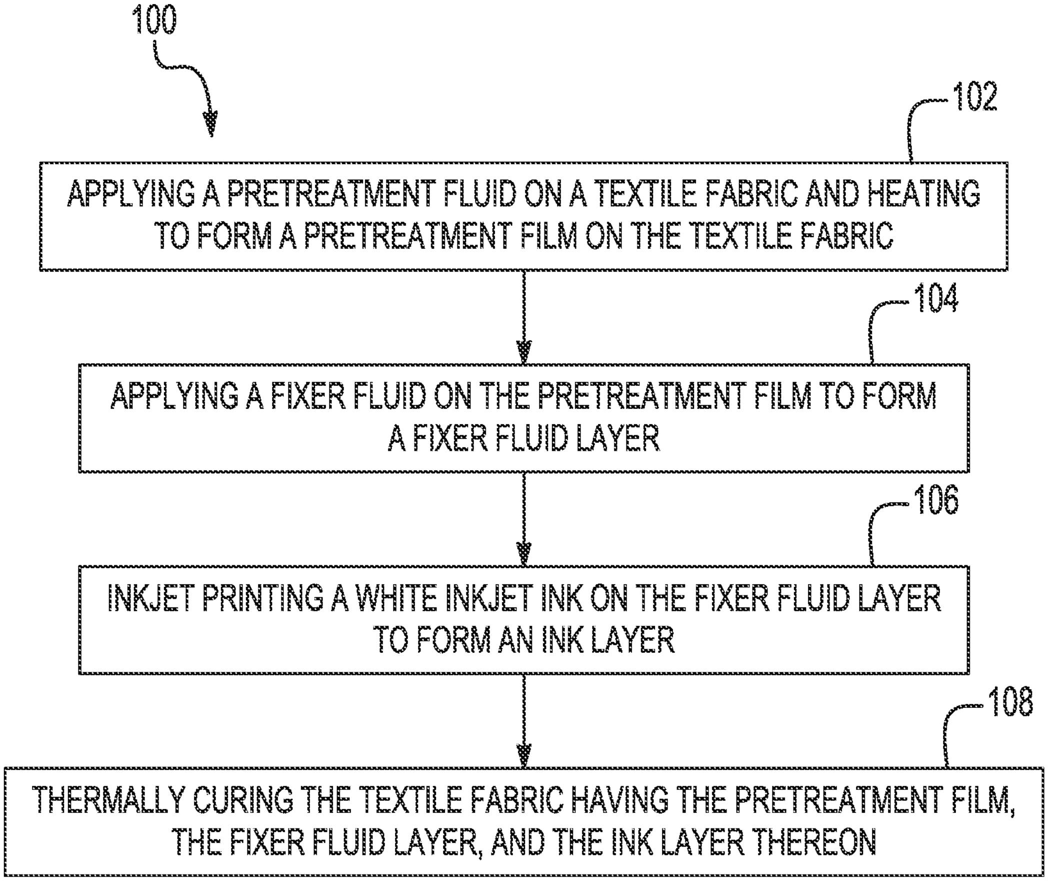
FIG. 2 is a flow diagram illustrating an example printing method.
Figure 3:
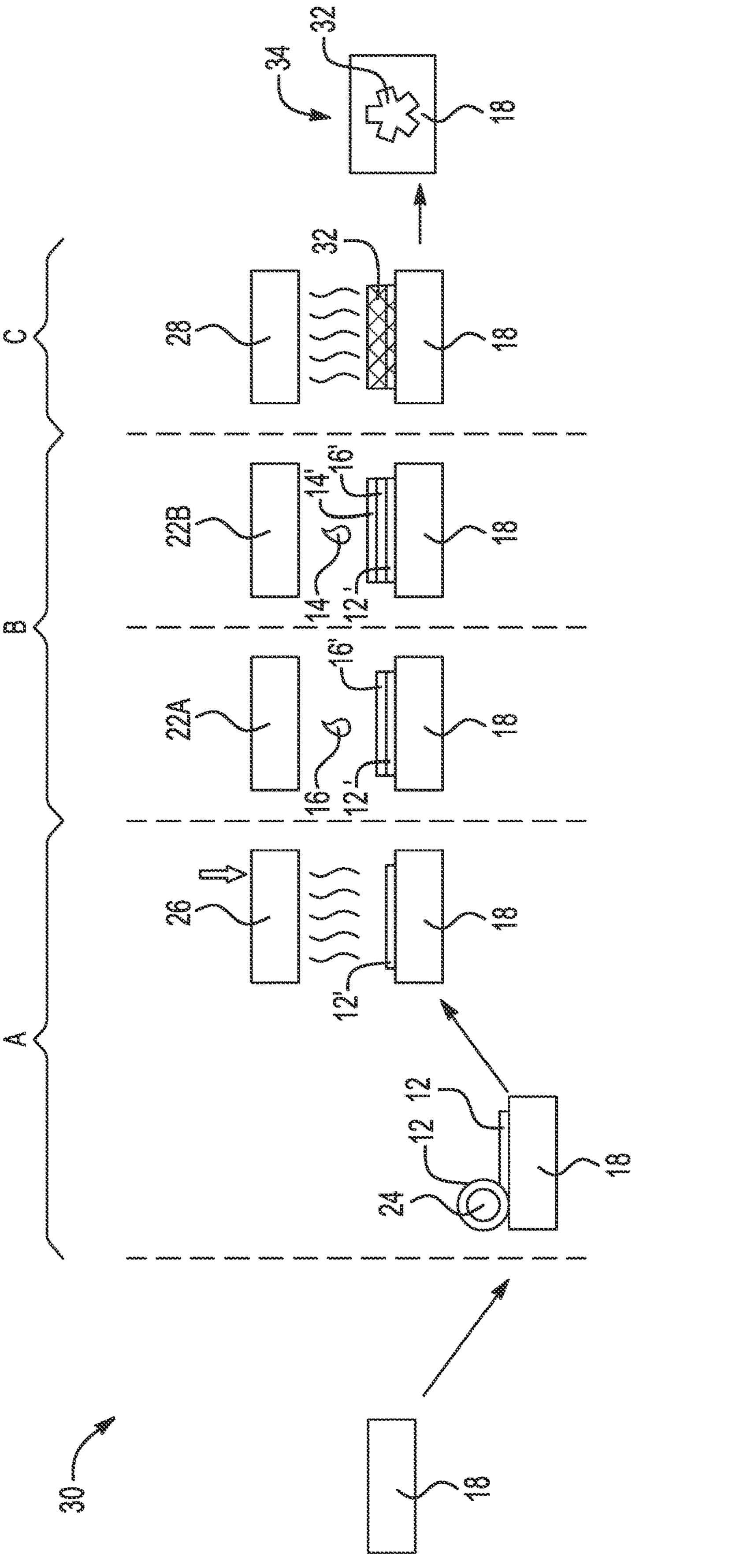
FIG. 3 is a schematic diagram of an example of a printing system.

FIG. 2 depicts an example of the printing method 100, and FIG. 3 depicts an example of a system 30 for performing the printing method 100. As shown in FIG. 2, an example of the printing method 100 comprises: applying a pretreatment fluid 12 on a textile fabric 18, the pretreatment fluid 12 including a linear siloxane comb polymer, a hydrophobic dendrimer, and an aqueous pretreatment vehicle (as shown at reference numeral 102); heating the textile fabric 18 having the pretreatment fluid 12 thereon, thereby forming a pretreatment film 12' (FIG. 3) on the textile fabric 18 (also shown at reference numeral 102); applying a fixer fluid 16 on the pretreatment film 12' to form a fixer fluid layer 16' (see FIG. 3), the fixer fluid 16 including a cationic polymer and an aqueous fixer vehicle (as shown at reference numeral

104); inkjet printing a white inkjet ink 14 on the fixer fluid layer 16' to form an ink layer 14' (see FIG. 3) (as shown at reference numeral 106); and thermally curing the textile fabric 18 having the pretreatment film 12', the fixer fluid layer 16', and the ink layer 14' thereon, thereby generating a print 32 (see FIG. 3) (as shown at reference numeral 108).

It is to be understood that any example of the pretreatment fluid 12, the fixer fluid 16, and the white inkjet ink 14 may be used in the examples of the method 100. Further, it is to be understood that any example of the textile fabric 18 may be used in the examples of the method 100.

As shown in reference numeral 102 in FIG. 2, the method 100 includes applying the pretreatment fluid 12 on the textile fabric 18 and heating the textile fabric 18 having the pretreatment fluid 12 thereon to form a pretreatment film 12' on the textile fabric 18.

The pretreatment fluid 12 is applied directly to the textile fabric 18. The application of the pretreatment fluid 12 may be accomplished via an analog method.

As examples of analog methods, the pretreatment fluid 12 may be applied using an auto analog pretreater, a drawdown coater, a slot die coater, a roller coater, a fountain curtain coater, a blade coater, a rod coater, an air knife coater, a sprayer, a padder, or a gravure application. In these examples, the pretreatment fluid 12 may be coated on all or substantially all of the textile fabric 18. In these examples, the layer of the pretreatment fluid 12 that is formed may be a continuous layer that covers all or substantially all of the textile fabric 18.

In an example, the pretreatment fluid 12 is applied in an amount ranging from about 50 gsm (grams per square meter, when wet) to about 120 gsm. In another example, the pretreatment fluid 12 is applied in an amount ranging from about 85 gsm to about 100 gsm.

The textile fabric 18 having the layer of the pretreatment fluid 12 thereon is exposed to heat to form the pretreatment film 12'. The application of heat may be accomplished using a heat press, an iron, or another suitable mechanism. In an example, thermally curing the textile fabric 18 having the pretreatment fluid 12 thereon involves heating to a temperature ranging from about 80° C. to about 200° C., and applying the heat for a time ranging from about 10 seconds to about 15 minutes. The temperature and time are sufficient to cure the linear siloxane comb polymer 13 and hydrophobic dendrimer 15 and form the pretreatment film 12'. In one specific example, the textile fabric 18 is a cotton fabric or a cotton blend fabric and heating the textile fabric 18 having the pretreatment fluid 12 thereon involves heating at a temperature ranging from about 80° C. to about 200° C. for a time ranging from about 10 seconds to about 10 minutes. In another specific example, the textile fabric 18 is a polyester fabric or a polyester blend fabric and heating the textile fabric 18 having the pretreatment fluid thereon involves heating at a temperature ranging from about 75° C. to about 150° C. for a time ranging from about 10 seconds to about 15 minutes.

Pressure may also be applied during the heating of the textile fabric 18 and the layer of the pretreatment fluid 12 thereon. The pressure applied to the textile fabric 18 (with the pretreatment fluid 12 thereon) ranges from about 0.1 atm to about 8 atm.

The cured pretreatment film, i.e., the pretreatment film 12', forms on the surfaces of the textile fabric fibers and/or in the pores between the textile fabric fibers. The pretreatment film 12' can slow down ink penetration into the textile fabric 18, which allows the pigment of the white inkjet ink 14 to be fixed, for example, through its interaction with the fixer fluid 16, at or near the surface of the textile fabric 18. This, in turn, improves the opacity and the image quality of the white image that is formed. Moreover, the film 12' can hold the hair-like fibers of the textile fabric 18, which reduces fibrillation and further improves image quality.

As shown in reference numeral 104 in FIG. 2, one example of the method 100 further includes applying the fixer fluid 16 on the pretreatment film 12' to form a fixer fluid layer 16' (shown in FIG. 3). The fixer fluid 16 is applied directly to the pretreatment film 12' on the textile fabric 18. The application of the fixer fluid 16 may be accomplished via an analog method or a digital inkjet printing method.

Any of the analog methods described herein for the pretreatment fluid 12 may be used to deposit the fixer fluid 16. Analog methods will generate a continuous fixer fluid layer 16'.

Alternatively, the application of the fixer fluid 16 may be accomplished via a digital inkjet printing method. As examples, the fixer fluid 16 may be applied using thermal inkjet printing or piezoelectric inkjet printing. Any suitable inkjet applicator, such as a thermal inkjet printhead, a piezoelectric printhead, a continuous inkjet printhead, etc. may be used. In these examples, the fixer fluid 16 may be printed at desirable areas (e.g., areas where the print 32 is to be generated). In these examples, the fixer fluid layer 16' that is formed by the application of the fixer fluid 16 may be non-continuous (e.g., may contain gaps) because the fixer fluid 16 may not be printed on areas of the textile fabric 18 where it is not desirable to form the print 32.

In an example, the amount of fixer fluid 16 that is applied depends upon the amount of white inkjet ink 14 that is to be applied. In some examples, the fixer fluid 16 is applied in an amount ranging from about 10 gsm to about 100 gsm. In other examples, the fixer fluid 16 is applied in an amount ranging from about 50 gsm to about 75 gsm.

As shown in reference numeral 106 in FIG. 2, the method 100 also includes inkjet (e.g., thermal inkjet or piezoelectric inkjet) printing the white inkjet ink 14 on the fixer fluid layer 16' to form an ink layer 14' (shown in FIG. 3). It is to be understood that the white inkjet ink 14 is printed at desirable areas to form an image (e.g., print 32).

In an example, the white inkjet ink 14 is applied in an amount ranging from about 200 gsm to about 400 gsm. In another example, the white inkjet ink 14 is applied in an amount ranging from about 200 gsm to about 350 gsm.

In some examples, multiple inkjet inks (including the white inkjet ink 14) may be inkjet printed onto the textile fabric 18. In these examples, each of the other inkjet inks may include a pigment, an example of the polymeric binder, and the ink vehicle. Each of the inkjet inks may include a different colored pigment so that a different color (e.g., cyan, magenta, yellow, black, violet, green, brown, orange, purple, etc.) is generated by each of the inkjet inks. In other examples, a single white inkjet ink 14 may be inkjet printed onto the textile fabric 18.

When used, both the fixer fluid 16 and the white inkjet ink 14 are applied after the pretreatment film 12' has been formed. As an example, the fixer fluid 16 and the white inkjet ink 14 are applied sequentially, using digital inkjet printing, one immediately after the other as the applicators (e.g., cartridges, pens, printheads, etc.) pass over the textile fabric 18. As such, the white inkjet ink 14 is printed onto the fixer fluid layer 16' while the fixer fluid layer 16' is wet. Wet-on-wet printing may be desirable because less fixer fluid 16 may be applied during this process (as compared to if the fixer fluid 16 were to be dried prior to white inkjet ink 14 application), and because the printing workflow may be simplified without the additional drying. In an example of wet-on-wet printing, the white inkjet ink 14 is printed onto the fixer fluid layer 16' within a period of time ranging from about 0.01 second to about 30 seconds after the fixer fluid 16 is printed. In further examples, the white inkjet ink 14 is printed onto the fixer fluid layer 16' within a period of time ranging from about 0.1 second to about 20 seconds; or from about 0.2 second to about 10 seconds; or from about 0.2 second to about 5 seconds after the fixer fluid 16 is applied. Wet-on-wet printing may be accomplished in a single pass.

The inkjet printing of the fixer fluid 16 and the white inkjet ink 14 may be accomplished at high printing speeds. In an example, the inkjet printing of the fixer fluid 16 and the white inkjet ink 14 may be accomplished at a printing speed of at least 25 feet per minute (fpm). In another example, the fixer fluid 16 and the white inkjet ink 14 may be inkjet printed at a printing speed ranging from 100 fpm to 1000 fpm.

As shown in reference numeral 108 in FIG. 2, the method 100 includes thermally curing the textile fabric 18 having the pretreatment film 12', the fixer fluid layer 16', and the ink layer 14' thereon, there generating a print 32 (shown in FIG. 3). The thermal curing may be accomplished by applying heat to the textile fabric 18. In an example of the method 100, the thermal curing involves heating the textile fabric 18 (having the film 12' and layers 14', 16' thereon) to a temperature ranging from about 80° C. to about 200° C., for a period of time ranging from about 10 seconds to about 15 minutes. In another example, the temperature ranges from about 100° C. to about 180° C. In still another example, thermal curing is achieved by heating the textile fabric 18 to a temperature of 150° C. for about 3 minutes.

Pressure may also be applied during thermal curing. The pressure applied to the textile fabric 18 (with the pretreatment film 12', the fixer fluid layer 16', and the ink layer 14' thereon) ranges from about 0.1 atm to about 8 atm.

Referring now to FIG. 3, a schematic diagram of a printing system 30 is depicted. The printing system 30 includes three zones A, B, C, including a pretreatment zone A, a printing zone B, and a curing zone C.

In one example, the textile fabric/substrate 18 may be transported through the printing system 30 to the pretreatment zone A. In the pretreatment zone A, an example of the pretreatment fluid 12 is applied to the textile fabric 18. The pretreatment fluid 12 may be applied using an analog applicator 24 (e.g., an auto analog pretreater, a drawdown coater, a slot die coater, a roller coater, a fountain curtain coater, a blade coater, a rod coater, an air knife coater, a sprayer, or a gravure application).

The textile fabric 18 (having the wet pretreatment fluid 12 thereon) remains in the pretreatment zone A, where it is exposed to heating. The application of heat may be accomplished, for example, using a heat press 26 or other suitable heating mechanism. As described in reference to FIG. 2, this heating process is sufficient to form the pretreatment film 12'.

The textile fabric 18 is then transported through the printing zone B where an example of the fixer fluid 16 is first applied onto the cured pretreatment film 12'. The fixer fluid 16 may be applied by an analog method or by an inkjet printhead 22A. In the printing zone B, the white inkjet ink 14 is also applied to the fixer fluid layer 16' to from an ink layer 14'.

The fixer fluid layer 16' and the ink layer 14' may be heated in the printing zone B (for example, the air temperature in the printing zone B may range from about 10° C. to about 90° C.) such that water may be at least partially evaporated from the layers 14', 16'.

The textile fabric 18 (having the pretreatment film 12', the fixer layer 16', and the ink layer 14' thereon) may then be transported to the curing zone C where the layers 14' and 16' are heated to cure the layer 14', 16' and form the print 32. Heating may be performed using any suitable heating mechanism 28, such as a heat press, oven, etc. The heat generated is sufficient to initiate film formation and cross-linking or other interactions that bind the pigment onto the textile fabric 18. The heat to initiate fixation (thermal curing) may range from about 80° C. to 200° C. as described above. This process forms the printed article 34 including the image 32 formed on the textile fabric 18.

While the example method 100 and system 30 described in reference to FIG. 2 and FIG. 3 have been described with the pretreatment fluid 12, the fixer fluid 16, and the white inkjet ink 14, it is to be understood that the method 100 may be performed with the pretreatment fluid 12 and the fixer fluid 16, without the white inkjet ink 14. Alternatively, the method 100 may be performed with the pretreatment fluid 12 and the white inkjet ink 14, without the fixer fluid 16. This example method is similar to the method 100, except that the fixer fluid 16 is not applied after formation of the pretreatment film 12' and prior to the application of the inkjet ink 14. This example system 30 is similar to that shown in FIG. 3, except that the inkjet applicator 22A would not be included in the printing zone B.

To further illustrate the present disclosure, examples are given herein. It is to be understood that these examples are provided for illustrative purposes and are not to be construed as limiting the scope of the present disclosure.

EXAMPLES

Example 1

Two commercially available water repellants including a linear siloxane comb polymer and a hydrophobic dendrimer (RUCO-DRY ECO® and RUCO-DRY ECO PLUS®) were used to prepare two pretreatment fluids (PT 1 and PT 2). RUCO-DRY ECO® and RUCO-DRY ECO PLUS® were each diluted to 8 wt % active with deionized water.

The pH and viscosity of each of PT 1 and PT 2 were measured. The pH was measured with an ACCUMET™ XL250 pH meter (available from Fisher Scientific, Inc.™, USA). The viscosity was measured using a VISCOLITE™ viscometer (from Hydromotion), at a temperature of about 25° C. and a shear rate of about 3,000 Hz. The formulations, pH's, and viscosities of each of the pretreatment fluids are shown in Table 1.

TABLE 1

| Pretreatment Fluids | | |
|---|---|---|
| Specific Component | PT 1 | PT 2 |
| RUCO-DRY ECO ® | 8 wt % active | — |
| RUCO-DRY ECO PLUS ® | — | 8 wt % active |
| Deionized Water | Balance | Balance |
| pH | 4.2 | 4.01 |
| Viscosity (cP) | 1.5 | 1.4 |

A fixer fluid and a white inkjet ink were also used in this example. The formulations of the fixer fluid and of the white inkjet ink are respectively shown in Tables 2 and 3.

TABLE 2

| Fixer Fluid | | |
|---|---|---|
| Ingredient | Specific Component | wt % active |
| Co-solvent | 2,2-dimethyl-1,3-propanediol | 4 |
| Azetidinium-containing polyamine | POLYCUP ™ 7360A | 4 |
| Non-ionic surfactant | SURFYNOL ® 440 | 0.3 |
| Phosphate ester surfactant | CRODAFOS ® N10A | 0.5 |
| Water | Deionized water | Balance |

TABLE 3

| White Inkjet Ink | | |
|---|---|---|
| Ingredient | Specific Component | wt % active |
| Pigment dispersion | White pigment dispersion | 10 |
| Co-solvent | 1,3-propanediol | 12 |
| Non-ionic surfactant | SURFYNOL ® 440 | 0.3 |
| Binder dispersion | Polyester polyurethane | 10 |
| Anti-decel agent | LIPONIC ® EG-1 | 2 |
| Antimicrobial agent | ACTICIDE ® B20 | 0.04 |
| Rheology modifier | Boehmite | 0.3 |
| Water | Deionized water | Balance |

Gildan black midweight 780 cotton T-shirts (referred to herein as GBC), Gildan performance black polyester T-shirts (42,000/staple yarn) (referred to herein as GBPE), and Hanes COOL DRI® red polyester T-shirts (filament yarn) (referred to herein as HPE) were used as the textile fabrics.

Each of the fabrics was used to generate comparative prints and example prints. Comparative prints (1C, 2C, and 3C) did not have any pretreatment fluid (PT 1 or PT 2) applied thereto and were not exposed to any other form of pretreatment processing. Example prints 1A, 2A, and 3A were pretreated with PT 1. Example prints 1B, 2B, and 3B were pretreated with PT 2.

When used, PT 1 and PT 2 were applied on the respective fabric to form a thin layer with a loading ranging from about 62 gsm to about 100 gsm. The specific loading of the pretreatment fluids, when used, are shown in Table 4. The curing conditions for PT 1 and PT 2 varied for the different examples based on the type of fabric used. Each example print underwent a first thermal curing step after the application of the respective pretreatment fluid. The comparative prints (1C, 2, and 30) were not pretreated, and thus were not exposed to the first thermal curing step.

All of the prints (comparative and example) were generated with the fixer fluid and the white inkjet ink. For each print (comparative and example), the fixer fluid (total of 9.16 gsm) and the inkjet ink (total of 50.0 gsm) were inkjet printed (using an 11 ng thermal inkjet printhead and wet on wet printing) over 6 passes. Each print (comparative and example) was exposed to a second thermal curing step after the application of the fixer fluid and white inkjet ink. The thermal curing conditions for each print are also shown in Table 4.

TABLE 4

| Pretreatment and Print Curing Conditions | | | |
|---|---|---|---|
| PRINT ID | Textile Fabric/ Pretreatment/ PT loading (gsm) | Pretreatment Curing Conditions | Print Thermal Curing Conditions |
| Example Print 1A | GBC/PT 1/ 90.5 gsm | Heat press 150° C. for 1 minute | Heat press 150° C. for 3 minutes |
| Example Print 1B | GBC/PT 2/ 99.8 gsm | Heat press 150° C. for 1 minute | Heat press 150° C. for 3 minutes |
| Comparative Print 1C | GBC/None | None | Heat press 150° C. for 3 minutes |
| Example Print 2A | GBPE/PT 1/ 66.0 gsm | Heat press 100° C. for 2 minutes | Oven 100° C. for 10 minutes |
| Example Print 2B | GBPE/PT 2/ 72.2 gsm | Heat press 100° C. for 2 minutes | Oven 100° C. for 10 minutes |
| Comparative Print 2C | GBPE/None | None | Oven 100° C. for 10 minutes |
| Example Print 3A | HPE/PT 1/ 62.1 gsm | Heat press 100° C. for 2 minutes | Oven 100° C. for 10 minutes |
| Example Print 3B | HPE/PT 2/ 62.8 gsm | Heat press 100° C. for 2 minutes | Oven 100° C. for 10 minutes |
| Comparative Print 3C | HPE/None | None | Oven 100° C. for 10 minutes |

The example prints and the comparative print were tested for opacity, in terms of L*, i.e., lightness, of the white print. The results are shown in Table 5.

The measurements were taken with an X-Rite color measurement instrument. A greater L* value indicates a greater opacity of the white ink on the colored textile fabric. All of the example prints on a particular fabric type (GBC, GBPE, HPE) had improved opacity compared to the comparative prints on the same fabric.

All of the example and comparative example prints were also tested for washfastness and change in opacity after being washed 5 times. For the washfastness test, the L*a*b* values of a color (e.g., white) before and after the 5 washes were measured. For the change in opacity test, the L* values of the color (e.g., white) before and after the 5 washes were measured. L* is lightness (as noted above), a* is the color channel for color opponents green-red, and b* is the color channel for color opponents blue-yellow. After the initial L*a*b* measurements were taken, each example print and each comparative example print was washed 5 times in a Whirlpool Washer (Model WTW5000DW) with warm water (at about 40° C.) and detergent. Each example print and each comparative example print was allowed to air dry between each wash. Then, the L*a*b* values after the 5 washes of each example and comp. print were measured. ΔL* was calculated by subtracting the L* taken after the 5 washed from the L* taken before the 5 washed. $\Delta E_{76}$ was calculated as described herein.

The results are shown in Table 5.

TABLE 5

Opacity and Washfastness

| | | | Before Wash | | | After 5 Washes | | | | |
|---|---|---|---|---|---|---|---|---|---|---|
| Print ID | Fabric | Pretreatment Fluid | L* | a* | b* | L* | a* | b* | ΔL* | $\Delta E_{76}$ |
| Example Print 1A | GBC | PT 1 | 93.0 | −1.4 | −1.7 | 92.8 | −1.3 | −2.1 | −0.2 | 0.5 |
| Example Print 1B | GBC | PT 2 | 92.9 | −1.5 | −1.1 | 93.1 | −1.3 | −1.4 | 0.1 | 0.4 |
| Comp. Print 1C | GBC | None | 83.6 | −2.5 | −5.1 | 82.1 | −2.3 | −5.4 | −1.5 | 1.6 |
| Example Print 2A | GBPE | PT 1 | 89.4 | 0.3 | −2.6 | 89.2 | 0.3 | −3.0 | −0.2 | 0.5 |
| Example Print 2B | GBPE | PT 2 | 89.3 | 0.2 | −3.2 | 89.2 | 0.5 | −3.6 | −0.2 | 0.6 |
| Comp. Print 2C | GBPE | None | 85.4 | −0.8 | −4.1 | 84.9 | −0.8 | −4.2 | −0.5 | 0.5 |
| Example Print 3A | HPE | PT 1 | 90.9 | 8.8 | −1.6 | 90.7 | 9.4 | −1.9 | −0.2 | 0.7 |
| Example Print 3B | HPE | PT 2 | 90.3 | 8.6 | −1.8 | 89.9 | 9.1 | −2.3 | −0.4 | 0.8 |
| Comp. Print 3C | HPE | None | 86.2 | 11.3 | −2.2 | 85.9 | 11.3 | −2.4 | −0.3 | 0.4 |

L* values were higher for Example Prints 1A and 1B before washing (93.0 and 92.9) and after washing (92.8 and 93.1) in comparison to Comparative Print 1C before washing (83.6) and after washing (82.1). L* values were higher for Example Prints 2A and 2B before washing (89.4 and 89.3) and after washing (89.2 and 89.2) in comparison to Comparative Print 2C before washing (85.4) and after washing (84.9). L* values were higher for Example Prints 3A and 3B before washing (90.9 and 90.3) and after washing (90.7 and 89.9) in comparison to Comparative Print 3C before washing (86.2) and after washing (85.9). These results indicate that the pretreatment fluids, PT 1 and PT 2, improved the overall opacity of white prints formed on both cotton and polyester textile fabrics and good washfastness.

Photographic images of the example and comparative prints were also taken before and after the 5 test washes. The originally colored photographs are reproduced herein in black and white in FIGS. 5A-5F, 6A-6F, and 7A-7F.

Figure 5A:
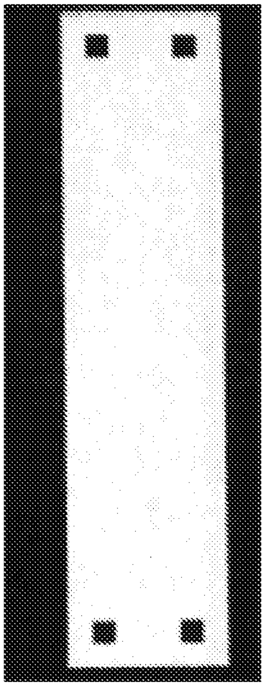
FIG. 5A through FIG. 5F are black and white reproductions of originally colored photographs of comparative prints (FIGS. 5E and 5F) and example prints prepared with a first pretreatment fluid (FIGS. 5A and 5B) and a second pretreatment fluid (FIGS. 5C and 5D) on a black cotton fabric, illustrating improved opacity and washfastness for the prints utilizing the pretreatment fluids.
Figure 5B:
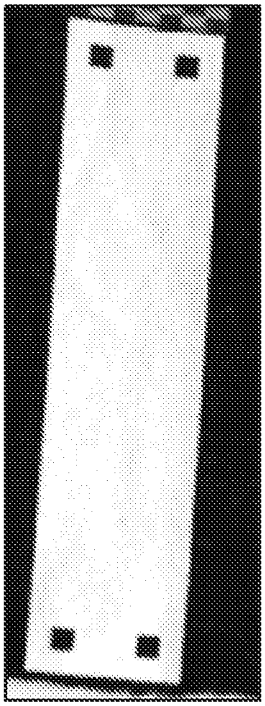
Figure 5C:
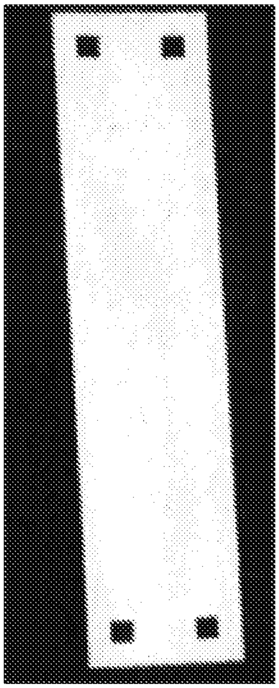
Figure 5D:
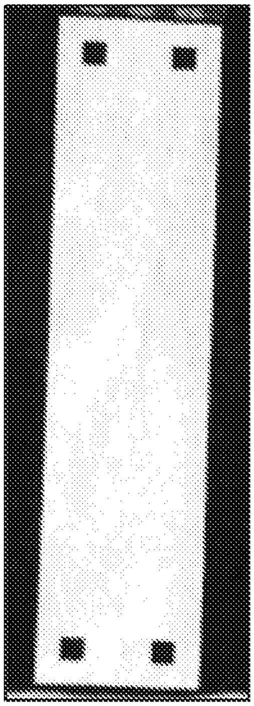
Figure 5E:
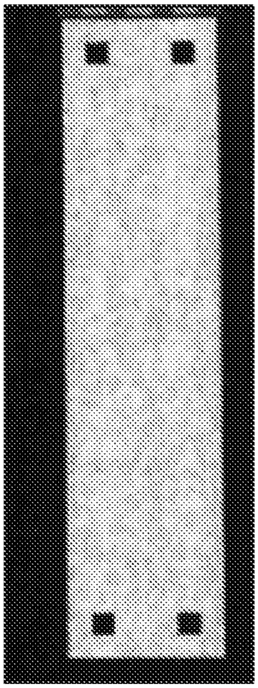
Figure 5F:
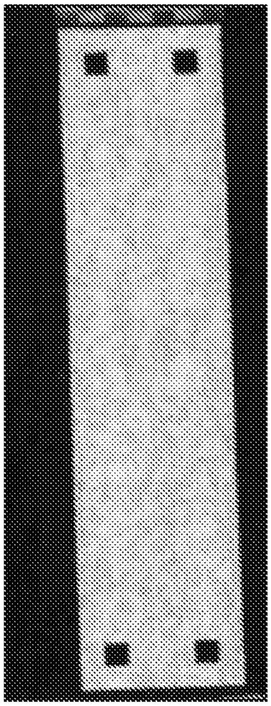

The example and comparative prints generated on GBC are shown in FIGS. 5A through 5F. FIG. 5A represents Example Print 1A before washing, and FIG. 5B represents Example Print 1A after washing. FIG. 5C represents Example Print 1B before washing, and FIG. 5D represents Example Print 1B after washing. FIG. 5E represents Comparative Example Print 1C before washing, and FIG. 5F represents Comparative Example Print 1C after washing.

Figure 6B:
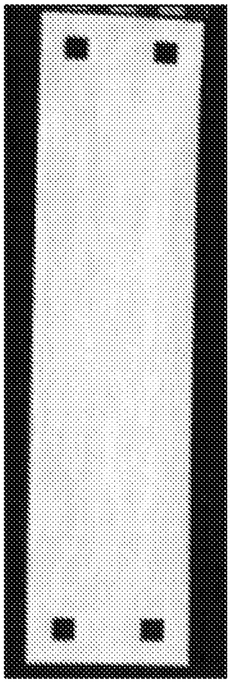
FIG. 6A through FIG. 6F are black and white reproductions of originally colored photographs of comparative prints (FIGS. 6E and 6F) and example prints prepared with a first pretreatment fluid (FIGS. 6A and 6B) and a second pretreatment fluid (FIGS. 6C and 6D) on a black polyester fabric, illustrating improved opacity and washfastness for the prints utilizing the pretreatment fluids.
Figure 6D:
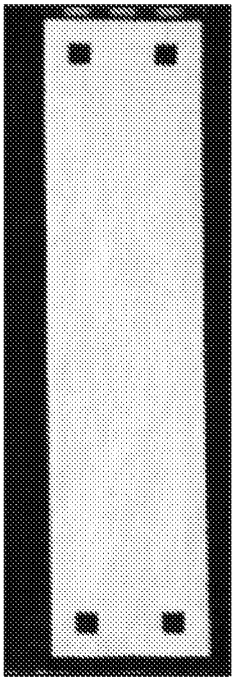
Figure 6F:
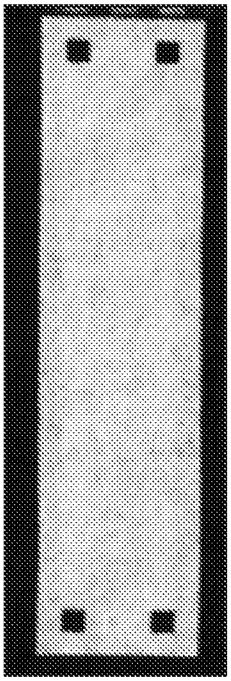
Figure 6A:
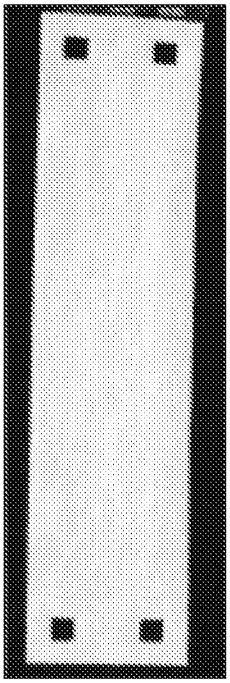
Figure 6C:
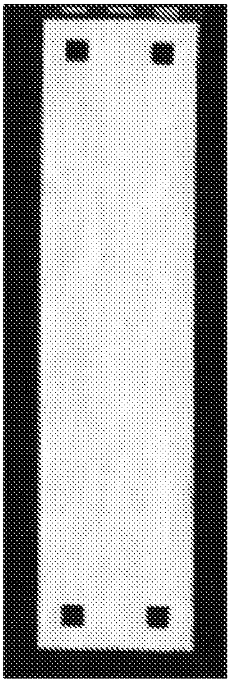
Figure 6E:
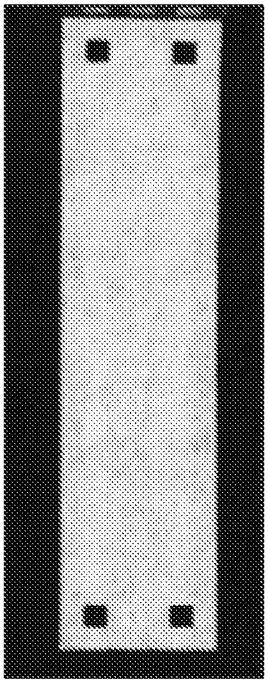

The example and comparative prints generated on GBPE are shown in FIGS. 6A through 6F. FIG. 6A represents Example Print 2A before washing, and FIG. 6B represents Example Print 2A after washing. FIG. 6C represents Example Print 2B before washing, and FIG. 6D represents Example Print 2B after washing. FIG. 6E represents Comparative Example Print 2C before washing, and FIG. 6F represents Comparative Example Print 2C after washing.

Figure 7B:
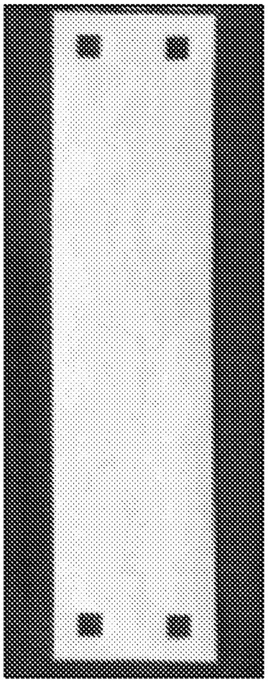
FIG. 7A through FIG. 7F are black and white reproductions of originally colored photographs of comparative prints (FIGS. 7E and 7F) and example prints prepared with a first pretreatment fluid (FIGS. 7A and 7B) and a second pretreatment fluid (FIGS. 7C and 7D) on a red polyester fabric, illustrating improved opacity and washfastness for the prints utilizing the pretreatment fluids.
Figure 7D:
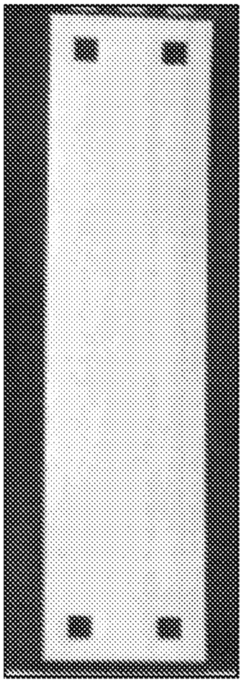
Figure 7F:
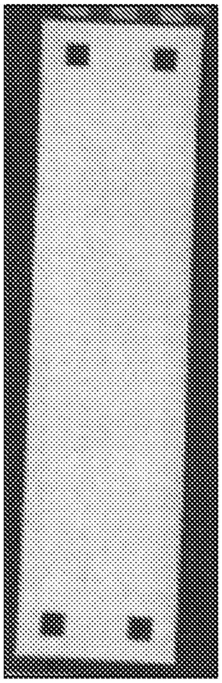
Figure 7A:
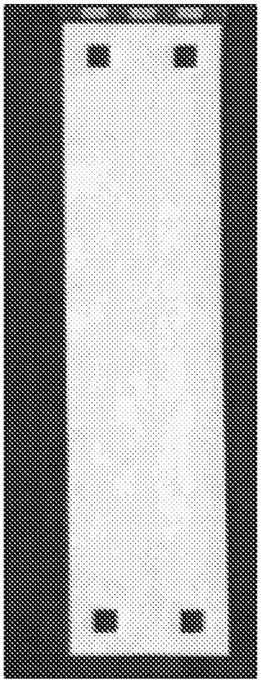
Figure 7C:
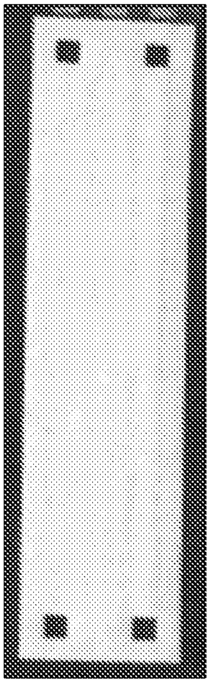
Figure 7E:
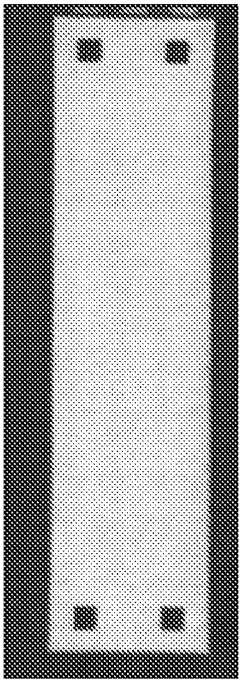

The example and comparative prints generated on HPE are shown in FIGS. 7A through 7F. FIG. 7A represents Example Print 3A before washing, and FIG. 7B represents Example Print 3A after washing. FIG. 7C represents Example Print 3B before washing, and FIG. 7D represents Example Print 3B after washing. FIG. 7E represents Comparative Example Print 3C before washing, and FIG. 7F represents Comparative Example Print 3C after washing.

The photographs visually depict that all of the example prints (pretreated with PT 1 or PT 2) generated on a particular textile fabric displayed significantly improved opacity and image quality in comparison to the comparative example prints (which received no pretreatment) generated on the same textile fabric. The visual results correspond with the quantitative data provided in Table 5.

Example 2

PT 1 and PT 2 from Example 1 were used in this example.

Two comparative pretreatment fluids (PT 3 and PT4) were also prepared. The comparative pretreatment fluids, PT 3 and PT 4, respectively included the commercially available silicone water repellants TEGO® Phobe 1401 and TEGO® Phobe 1409 (each from Evonik Ind.). TEGO® Phobe 1401 and TEGO® Phobe 1409 were each diluted to 8 wt % active with deionized water to form the comparative pretreatment fluids PT 3 and PT 4. The particle size of the silicone in each of TEGO® Phobe 1401 and TEGO® Phobe 1409 is similar to the particle size of the linear siloxane comb polymer and hydrophobic dendrimer in each of the RUCO-DRY ECO® and RUCO-DRY ECO PLUS®.

The fixer fluid and the white inkjet ink from Example 1 were also used in this example.

Gildan black midweight 780 cotton (GBE) was used as the textile fabric.

A control print was prepared. The control print had no pretreatment fluid and was not exposed to a pretreatment thermal curing step. The fixer fluid and white inkjet ink were printed as described in Example 1, and the control print was thermally cured as set forth in Table 6.

Example print 4A was pretreated with PT 1 and example print 4B was pretreated with PT 2. Comparative prints 4C and 4D were respectively pretreated with PT 3 and PT 4. The pretreatment fluid loadings and thermal curing conditions are shown in Table 6.

All of the prints (comparative and example) were generated with the fixer fluid and the white inkjet ink. For each print (comparative and example), the fixer fluid (total of 9.16 gsm) and the inkjet ink (total of 50.0 gsm) were inkjet printed (using an 11 ng thermal inkjet printhead and wet on wet printing) over 6 passes. Each print (comparative and example) was exposed to a second thermal curing step after the application of the fixer fluid and white inkjet ink. The thermal curing conditions for each print are also shown in Table 6.

TABLE 6

| Pretreatment and Print Curing Conditions | | | |
|---|---|---|---|
| PRINT ID | Textile Fabric/ Pretreatment/ PT loading (gsm) | Pretreatment Curing Conditions | Print Thermal Curing Conditions |
| Control Print | GBC/None | None | Heat press 150° C. for 3 minutes |
| Example Print 4A | GBC/PT 1/ 90.5 gsm | Heat press 150° C. for 1 minute | Heat press 150° C. for 3 minutes |
| Example Print 4B | GBC/PT 2/ 99.8 gsm | Heat press 150° C. for 1 minute | Heat press 150° C. for 3 minutes |
| Comp. Print 4C | GBC/PT 3/ 96.8 gsm | Heat press 150° C. for 1 minute | Heat press 150° C. for 3 minutes |
| Comp. Print 4D | GBPE/PT 4/ 104.3 gsm | Heat press 150° C. for 1 minute | Heat press 150° C. for 3 minutes |

The control print, the example prints, and the comparative example prints were tested for opacity, in terms of the L*. The results are shown in Table 7.

TABLE 7

| Opacity | | |
|---|---|---|
| PRINT ID | Pretreatment Fluid | L* |
| Control Print | None | 83.6 |
| Example Print 4A | PT 1 | 93.0 |
| Example Print 4B | PT 2 | 92.9 |
| Comp. Print 4C | PT 3 | 87.3 |
| Comp. Print 4D | PT 4 | 87.8 |

The example pretreatment fluids PT 1 and PT 2 (containing the linear siloxane comb polymer and hydrophobic dendrimer based water repellants) generated white prints having a higher opacity than the comparative pretreatment fluids PT 3 and PT 4 (containing silicone based water repellants).

It is to be understood that the ranges provided herein include the stated range and any value or sub-range within the stated range, as if the value(s) or sub-range(s) within the stated range were explicitly recited. For example, a range from about 3 wt % active to about 20 wt % active, should be interpreted to include not only the explicitly recited limits of from about 3 wt % active to about 20 wt % active, but also to include individual values, such as about 4.15 wt % active, about 12.5 wt % active, 14.0 wt % active, 16.77 wt % active, 18 wt % active, etc., and sub-ranges, such as from about 5 wt % active to about 15 wt % active, from about 3 wt % active to about 17 wt % active, from about 10 wt % active to about 20 wt % active, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A multi-fluid kit for textile printing, comprising:

a pretreatment fluid including:

a linear siloxane comb polymer;

a hydrophobic dendrimer; and an aqueous pretreatment vehicle; and a fixer fluid including:

a cationic polymer; and an aqueous fixer vehicle.

2. The multi-fluid kit as defined in claim 1 wherein the hydrophobic dendrimer comprises a first generation dendrimer having a structure:

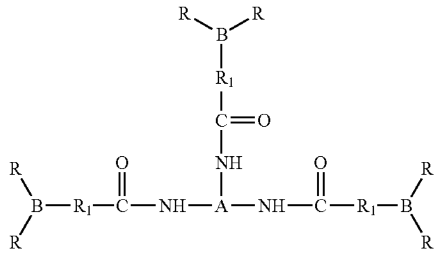

wherein:

A is a molecule with three electron-donating isocyanate groups;

B is CH or N;

R is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—$(CH_2)_z$—H; and NH—C(O)—NH—$(CH_2)_z$—H, where y is an integer from 0 to 2 and z is an integer from 11 to 21; and $R_1$ is selected from the group consisting of $(CH_2)_x$, $O(CH_2)_x$, and NH—$CH(CH_3)$, where x is an integer from 0 to 2.

3. The multi-fluid kit as defined in claim 2 wherein the pretreatment fluid further includes a second hydrophobic dendrimer that is a higher generation dendrimer than the first generation dendrimer.

4. The multi-fluid kit as defined in claim 1 wherein the hydrophobic dendrimer comprises a higher than first generation dendrimer having a structure:

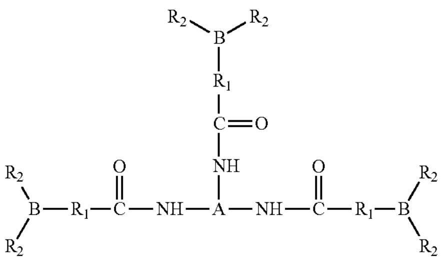

wherein:

A is a molecule with three electron-donating isocyanate groups;

B is CH or N;

$R_1$ is selected from the group consisting of $(CH_2)_x$, $O(CH_2)_x$, and NH—$CH(CH_3)$, where x is an integer from 0 to 2;

at least one of $R_2$ is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—

$(CH_2)_z$—H; and NH—C(O)—NH—$(CH_2)_z$—H, where y is an integer from 0 to 2 and z is an integer from 11 to 21;

at least one other of $R_2$ is:

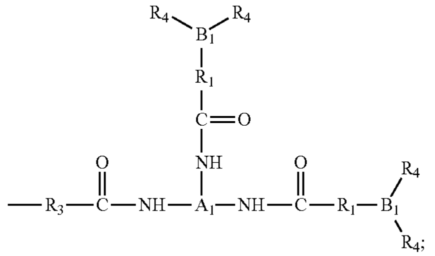

$A_1$ is the same as A;

$B_1$ is the same as B;

$R_3$ is $(CH_2)_p$—O or $CH(CH_3)$—NH, where p is an integer from 0 to 2; and $R_4$ is the same as the at least one $R_2$ that is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—$(CH_2)_z$—H; and NH—C(O)—NH—$(CH_2)_z$—H, where y is an integer from 0 to 2 and z is an integer from 11 to 21.

5. The multi-fluid kit as defined in claim 1 wherein the linear siloxane comb polymer has a structure:

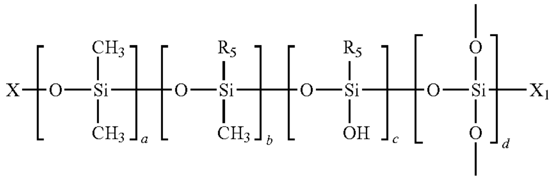

wherein:

X and $X_1$ are independently selected from the group consisting of $R_5$,

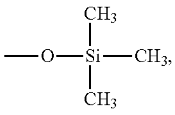

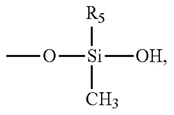 and

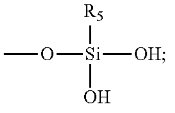

$R_5$ is selected from the group consisting of a $C_8$ to $C_{28}$ alkyl group,

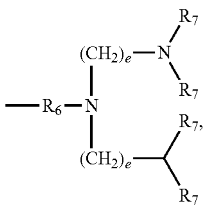

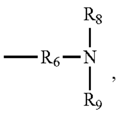

-continued

—$(CH_2)_f$—NH—$(CH_2)_g$—$NH_2$,

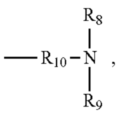

—$(CH_2)_g$—$NH_2$, and

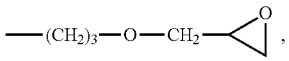

where $R_6$ is selected from the group consisting of

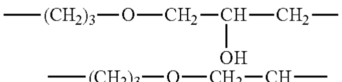

and

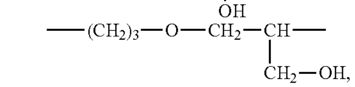

$R_7$ is a $C_1$ to $C_4$ alkyl group, $R_8$ is a $C_8$ to $C_{18}$ alkyl group, $R_9$ is a $C_8$ to $C_{18}$ alkyl group, $R_{10}$ is selected from the group consisting of —$(CH_2)_3$— and

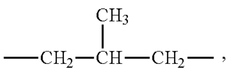

e is 2 or 3, f is 2 or 3, and g is 2 or 3;

a is an integer from 0 to 350;

b is an integer from 0 to 450;

c is an integer from 0 to 100; and d is an integer from 0 to 50.

6. The multi-fluid kit as defined in claim 1 wherein the hydrophobic dendrimer comprises a first generation dendrimer having a structure:

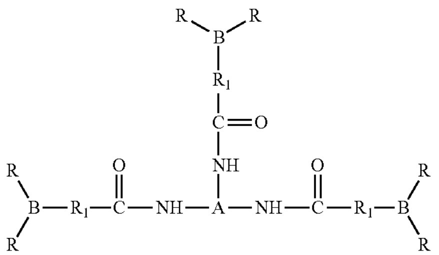

wherein:

A is a molecule with three electron-donating isocyanate groups;

B is CH or N;

R is selected from the group consisting of $(CH_2)_y$—O—C(O)—NH—$(CH_2)_z$—H; $(CH_2)_y$—O—C(O)—$(CH_2)_z$—H; $CH(CH_3)$—NH—C(O)—NH—$(CH_2)_z$—H; and NH—C(O)—NH—$(CH_2)_z$—H, where y is an integer from 0 to 2 and z is an integer from 11 to 21; and $R_1$ is selected from the group consisting of $(CH_2)_x$, $O(CH_2)_x$, and NH—$CH(CH_3)$, where x is an integer from 0 to 2; and the linear siloxane comb polymer has a structure:

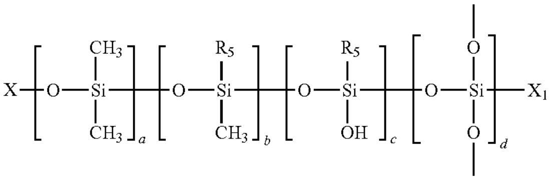

wherein:

X and $X_1$ are independently selected from the group consisting of $R_5$,

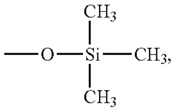

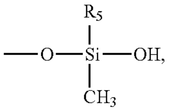

and

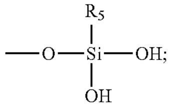

$R_5$ is selected from the group consisting of a $C_8$ to $C_{28}$ alkyl group,

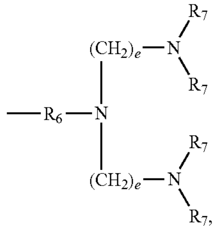

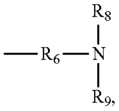

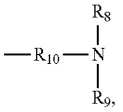

$-(CH_2)_f-NH-(CH_2)_g-NH_2$, $-(CH_2)_g-NH_2$, and

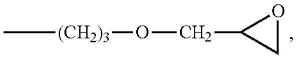

where $R_6$ is selected from the group consisting of

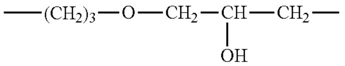

and

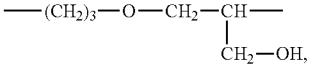

$R_7$ is a $C_1$ to $C_4$ alkyl group, $R_8$ is a $C_8$ to $C_{18}$ alkyl group, $R_9$ is a $C_8$ to $C_{18}$ alkyl group, $R_{10}$ is selected from the group consisting of $-(CH_2)_3-$ and

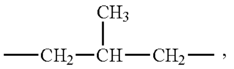

e is 2 or 3, f is 2 or 3, and g is 2 or 3;

a is an integer from 0 to 350;

b is an integer from 0 to 450;

c is an integer from 0 to 100; and d is an integer from 0 to 50.

7. The multi-fluid kit as defined in claim 1 wherein the pretreatment fluid includes:

from about 0.2 wt % active to about 5 wt % active of the linear siloxane comb polymer based on a total weight of the pretreatment fluid; and from about 1 wt % active to about 15 wt % active of the hydrophobic dendrimer based on the total weight of the pretreatment fluid.

8. The multi-fluid kit as defined in claim 1, further comprising a white inkjet ink.

9. The multi-fluid kit as defined in claim 1 wherein:

the cationic polymer is an azetidinium-containing polyamine; and the azetidinium-containing polyamine is present in an amount ranging from about 1 wt % active to about 15 wt % active based on a total weight of the fixer fluid.

10. A printing method, comprising:

applying a pretreatment fluid on a textile fabric, the pretreatment fluid including:

a linear siloxane comb polymer;

a hydrophobic dendrimer; and an aqueous pretreatment vehicle;

heating the textile fabric having the pretreatment fluid thereon, thereby forming a pretreatment film on the textile fabric;

applying a fixer fluid on the pretreatment film to form a fixer fluid layer, the fixer fluid including:

a cationic polymer; and an aqueous fixer vehicle;

inkjet printing a white inkjet ink on the fixer fluid layer to form an ink layer; and thermally curing the textile fabric having the pretreatment film, the fixer fluid layer, and the ink layer thereon, thereby generating a print.

11. The printing method as defined in claim 10 wherein the pretreatment fluid is applied via an analog method.

12. The printing method as defined in claim 10 wherein thermally curing the textile fabric having the pretreatment film, the fixer fluid layer, and the ink layer thereon involves heating at a temperature ranging from about 80° C. to about 200° C. for a time ranging from about 5 seconds to about 10 minutes.

13. The printing method as defined in claim 10 wherein the textile fabric is a cotton fabric or a cotton blend fabric and heating the textile fabric having the pretreatment fluid thereon involves heating at a temperature ranging from about 80° C. to about 200° C. for a time ranging from about 10 seconds to about 10 minutes.

14. The printing method as defined in claim 10 wherein the textile fabric is a polyester fabric or a polyester blend fabric and heating the textile fabric having the pretreatment fluid thereon involves heating at a temperature ranging from about 75° C. to about 150° C. for a time ranging from about 10 seconds to about 15 minutes.

15. A kit for textile printing, comprising:

a textile fabric selected from the group consisting of polyester fabrics, polyester blend fabrics, cotton fabrics, cotton blend fabrics, nylon fabrics, nylon blend fabrics, silk fabrics, silk blend fabrics, wool fabrics, wool blend fabrics, and combinations thereof;

a pretreatment fluid including:

a linear siloxane comb polymer;

a hydrophobic dendrimer; and an aqueous pretreatment vehicle;

a fixer fluid including:
a cationic polymer; and
an aqueous fixer vehicle; and
a white inkjet ink.

* * * * *